(12) United States Patent
Bhatia et al.

(10) Patent No.: US 10,255,299 B2
(45) Date of Patent: Apr. 9, 2019

(54) POLYTOPE AND CONVEX BODY DATABASE

(71) Applicants: Neha Bhatia, Gurgaon (IN); Shriguru Nayak, Ankola (IN); Prasanna Gorur Narayana Srinivasa, Bangalore (IN); Abhilasha Aswal, Bangalore (IN); Anushka Chandrababu, Bangalore (IN); Manjunath Sindagi, Hubli (IN)

(72) Inventors: Neha Bhatia, Gurgaon (IN); Shriguru Nayak, Ankola (IN); Prasanna Gorur Narayana Srinivasa, Bangalore (IN); Abhilasha Aswal, Bangalore (IN); Anushka Chandrababu, Bangalore (IN); Manjunath Sindagi, Hubli (IN)

(*) Notice: Subject to any disclaimer, the term of this patent is extended or adjusted under 35 U.S.C. 154(b) by 663 days.

(21) Appl. No.: 14/409,149

(22) PCT Filed: Jun. 21, 2013

(86) PCT No.: PCT/IN2013/000389
§ 371 (c)(1),
(2) Date: Dec. 18, 2014

(87) PCT Pub. No.: WO2013/190577
PCT Pub. Date: Dec. 27, 2013

(65) Prior Publication Data
US 2015/0324397 A1    Nov. 12, 2015

(30) Foreign Application Priority Data
Jun. 21, 2012    (IN) ............................ 2464/CHE/2012

(51) Int. Cl.
*G06F 17/30*    (2006.01)

(52) U.S. Cl.
CPC .... *G06F 17/30289* (2013.01); *G06F 17/3051* (2013.01); *G06F 17/30241* (2013.01); *G06F 17/30592* (2013.01)

(58) Field of Classification Search
CPC ................................................... G06F 17/3051
(Continued)

(56) References Cited

U.S. PATENT DOCUMENTS

2010/0257164 A1 * 10/2010 Halverson ......... G06F 17/30864
707/725
2011/0125702 A1 * 5/2011 Gorur Narayana Srinivasa ..........
G06Q 10/00
706/52

(Continued)

*Primary Examiner* — Baoquoc N To
(74) *Attorney, Agent, or Firm* — Smith Tempel Blaha LLC

(57) ABSTRACT

Extending the work in 2D/3D graphical databases, the present invention discuss constraints in high dimensional spaces, its efficient storage; relational algebra. The relational algebra includes queries like finding polytopes disjoint or intersecting with the given polytope; or finding a subset or superset of the polytope. This invention also presents methods to generate new information equivalent constraints set from existing constraints sets, presents new kinds of joins and a rich relational algebra of the constraints. Different methods such as distortion, rotation and shape scaling transformations are employed to obtain the information equivalent different sets of constraints. Also, this invention discusses queries to obtain the information equivalent constraints set of the given constraints set along with a new query language, when the data is in memory.

18 Claims, 21 Drawing Sheets

(58) Field of Classification Search
USPC .................................................. 707/706, 703
See application file for complete search history.

(56) References Cited

U.S. PATENT DOCUMENTS

2012/0005662 A1* 1/2012 Ringseth ................ G06F 8/453
717/149
2012/0089961 A1* 4/2012 Ringseth ................ G06F 8/314
717/106

* cited by examiner

```
C0
C1
C2
 :
C10
```

X0: C4 ∩ C6
X1: C1 ∩ C2 ∩ C3
X3: C1 ∩ C2 ∩ C3 ∩ C6
X4: C5 ∩ C4
X6: C3 ∩ C4

| | |
|---|---|
| $C_0 \cap C_1 \cap C_2 \cap C_0 \cap C_1 \cap C_4$ | $T_{0124}$ |
| $C_0 \cap C_1 \cap C_2 \cap C_1 \cap C_2 \cap C_4$ | $T_{0124}$ |
| $C_0 \cap C_1 \cap C_2 \cap C_0 \cap C_1 \cap C_3$ | $C_{02} \cap C_1 \cap C_3$ |
| $C_0 \cap C_2 \cap C_3\ C_0 \cap C_1 \cap C_4$ | $T_{0124} \cap C_3$ |
| $C_0 \cap C_2 \cap C_3 \cap C1 \cap C_2 \cap C_4$ | $T_{0124} \cap C_3$ |
| $C_0 \cap C_2 \cap C_3 \cap C_0 \cap C_1 \cap C_3$ | $C_{02} \cap C_1 \cap C_3$ |
| $C_2 \cap C_3 \cap C_4 \cap C_0 \cap C_1 \cap C_4$ | $T_{0124} \cap C_3$ |
| $C_2 \cap C_3 \cap C_4 \cap C_1 \cap C_2 \cap C_4$ | $C_2 \cap C_3 \cap C_{14}$ |
| $C_2 \cap C_3 \cap C_4 \cap C0 \cap C_1 \cap C_3$ | $T_{0124} \cap C_3$ |

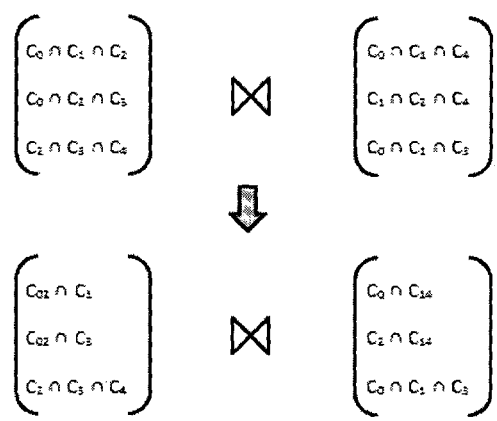

(a) Two relations being joined (b) Tuples in the relations

Figure 21

POLYTOPE AND CONVEX BODY DATABASE

BACKGROUND

Field of the Invention

This invention relates to a database for polytope and convex bodies, possibly with integral constraints.

Discussion of Prior Art

Every convex optimization problem has an objective function and one or more convex constraints. Efficient representation of convex constraints and sets of constraints is central for high performance. Non-degenerate convex constraint sets results in N-dimensional regions of non-zero volume, which offers new possibilities for database design and optimization.

Early work on constraint databases deals with GIS query processing, but does not discuss mathematical programming aspects. Other previous work, in this field describes constraint attribute systems, but none in a mathematical programming context. The rich structure of mathematical programming problems enables many unique features in this database, as opposed to general constraint programming systems.

Most of the previous work refers to polynomial time solvability of query expressions in First-order and higher logics, over polynomial constraints, but applications to uncertainty, or experimental runtimes were not reported. In addition, the rich mathematical theory of convex optimization including duality is not referred to.

U.S. Ser. No. 13/255,408 titled "New vistas in inventory optimization under uncertainty" describes a computer implemented method for carrying out inventory optimization under uncertainty. The method involves the step of feeding the information in the form of polyhedral formulation of uncertainty where the faces and edges of polytope are built from linear constraints that are derived from historical time series data. This approach leads to a generalization of basestock policies to multidimensional correlated variables which can be used in many contexts [1].

U.S. Ser. No. 13/003,507 titled "A computer implemented decision support method and system" describe a decision support method which extends on the robust optimization technique. The method involves the representation of the uncertainty as polyhedral uncertainty sets made of simple linear constraints derived from macroscopic economic data. The constraint sets are has pre-set and allowable parameters. It is applied in the field of capacity planning and inventory optimization problems in supply chains [1].

WO 2010/004585 titled "Decision support methods under uncertainty" describes a computer implemented method of handling uncertainty or hypothesis about operating systems by use of probabilistic formulation and constraints based method. The method finds the set theoretic relationship-subset, intersection and disjointness among the polytopes and proposes a method to visualize the relationship. This helps in the decision support for the relationship between the said constraint sets of the polytopes.

SUMMARY

The present invention describes the generation of a database engine for high-dimensional polytopes, which are convex bodies. We discuss methods to represent constraints and constraint sets, discuss a rich relational algebra of the constraint sets, present new kinds of joins, methods to generate new information equivalent constraint sets from existing constraint sets and optimization of queries. The constraint sets for the present invention are convex, although non-convex bodies can be represented by their convex approximations and the same methods can be applicable.

A polytope can be stored in the database in either a vertex-based representation or a facet-based or half plane representation. The specific contributions of the present invention includes recognizing that attributes, whose values are constraint sets, satisfy a richer partial ordering relation—equality, subset, disjoint and intersection, compared to just equality or inequality for attributes with exact values (which are constraint sets of zero volume). The richer partial ordering results in extensions to relational algebra and extended joins are presented. The non-zero volume enables to quantify information content and relate information theoretic concepts to data. The non-zero volume also results in information equivalences—new data of same/increased/decreased volume and information content as old data can be generated by volume preserving or possible distorting transformations. The equivalences in enable creation of a database engine, which generates new data from old, preserving invariants like information content. The need to represent constraint sets efficiently leads to extension of data compression schemes for 2/3Dimensional graphics, including both primal and dual space representations.

Different methods such as distortion, rotation and shape scaling transformations are employed to obtain different information equivalent sets of constraints. The data is generated by high speed joins for linear polytopes using incremental linear programming. The incremental linear programming approach can be used to obtain dual representation of the constraint sets instead of primal representation. The database generated will provide the facility to perform database queries to find the intersection of polytopes including discrete disjoint, intersection, subset, joins etc.

Every database table has a metadata associated with it called the I-structure, which helps to speed up the queries. I-structure is a graph, which maintains the subset-intersection-disjoint relationships between all the constraints and polytopes in the table and can be partially or fully populated and/or purged depending on usage of its constituent nodes/edges, using a method such as purging least-recently-used (LRU) nodes/edges.

The invention finds its usage in the applications which handle constraint data. The constraints are taken as an input and used in mathematical programming framework to get the desired answers. Such a database may find application in areas such as Supply Chain Management (SCM), Real Time Search (RTS), Banking and other allied domains primarily because all these involve solving large scale optimizations with a large number of constraints.

A major application of our invention is in representing uncertainty. Previous representations of uncertainty have been primarily probabilistic. The present invention considers only the support of uncertain/varying attributes (a robust optimization framework), and is able to quantify the information content of the uncertainty set—the latter is computationally difficult in a probabilistic framework. In this formulation the uncertainty set is a polyhedral the edges and facets of which are built from linear constraints, derivable from historical time-series data.

Independent of representing uncertainty, the present invention presents generalizations of previous work in constraint databases, where the values of the attributes vary in an N-dimensional region, which is not a rectangular box (i.e. dimensions of variation are correlated). Since the invention deals with continuous/high cardinality data, materialization of all values is not possible and the high-dimensionality of these applications precludes a dense scenario sampling—the possible world's framework is of limited utility. None of the prior art presents methods to quantify information content, detection of information equivalences, and generation of information equivalent variants of uncertain data.

BRIEF DESCRIPTION OF THE DRAWINGS

FIG. 21 illustrates join using common sub-expressions.

DETAILED DESCRIPTION OF PREFERRED EMBODIMENTS

Basic Constraint Set Representation

The canonical representation of polyhedral constraint sets is by specification of vertices, or faces i.e. half planes, as in Geographical Information System (GIS). Since the former requires a number of vertices exponential in the problem dimensionally and the present invention's applications are of high dimension, the latter approach was selected. Queries have to be handled using linear or convex programming i.e., a heavyweight operator.

For simplicity, the half plane representation is used, even though a combination of a vertex and a half plane hybrid representation offers in general higher information density. Even so, there are multifold representations of a polytope in this framework. The following classification is found to be useful:

1) Structural Representations are those, which specify the geometric boundaries of the polytope directly. In addition to standard half-plane, vertex and hybrid representations, the points on facets can be specified. Note that either primal or dual space can be used for these representations.
2) Synthetic Representations are those, which specify the polytope's construction from other polytopes, using expressions composed of standard polytope operators—union/intersection.

For example, a polytope C can be specified from polytopes A, B, D, and E as an expression (1)

$$C = A \cap B \cup D \cap E \qquad (1)$$

The class of synthetic representations can be clearly extended by including polytope transformation operators (translation, rotation, volume preserving distortions, scaling, represented by their matrices/vectors). These are especially interesting, since only a single canonical centered polytope needs to be stored and others generated on-line during query evaluation using appropriate transformations, with (partial) materialization used for non-canonical polytopes frequently encountered. These representations enable query optimization techniques analogous to similar ones in relational databases.

Figure 1:
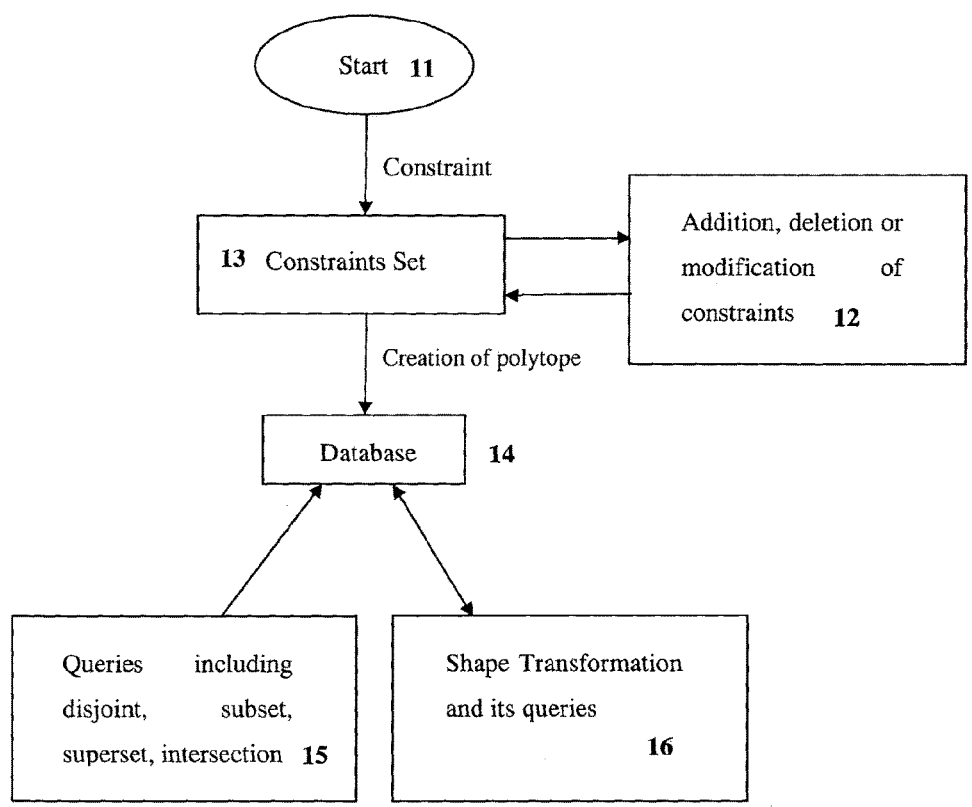
FIG. 1 illustrates architecture of database.

FIG. 1 illustrates the architecture of the relational constraint database for polytopes. These polytopes are formed as a result of a combination of linear constraints 11, 12 and 13. The polytope generator 13 creates constraints/polytopes and facilitates modification, addition or deletion of these constraints. The database 14 stores the constraint sets generated 13 as polytopes and performs various queries 15 upon it.

The polytopes are stored in the tables of the database in either the structural or the synthetic representation. Polytopes in a table have an I-structure associated with it which stores the subset-intersection-disjoint relationships between the polytopes. This is also stored within the database and used like an index for better query performance. Queries 15 include finding the disjoint, subset, superset or intersection of polytopes from one another. During this process, the I-structures are also used. The shape transformation 16 of polytopes such as rotation, scaling and distortion and related queries to access the transformed polytope is also supported. This query engine built supports a query language similar to Structured Query Language (SQL). The database finds usage in many applications 17 such as Supply Chain Management, Real Time Search and so on. Polytope generator 18 can be used to generate a large number of polytopes from a given polytope to populate the database.

Storage of Polytopes

A polytope can be stored in the database in two forms, i.e. either a vertex-based representation or a facet-based representation.

Figure 2:
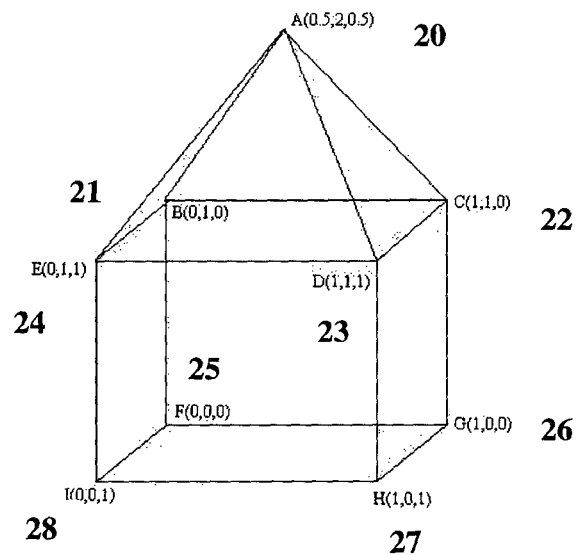
FIG. 2 illustrates a sample polytope.

FIG. 2 illustrates a sample polytope as in case of vertex-based representation. Here 9 vertices are stored, referred by reference numerals 20 to 28 and the relationship of each vertex from one another given by—A (0.5, 2, 0.5), B (0, 1, 0), C (1, 1, 0), D (1, 1, 1), E (0, 1, 1), F (0, 0, 0), G (1, 0, 0), H (1, 0, 1) and I (0, 0, 1). Since, the vertices and edges can extend exponentially in N-Dimension, this approach does not scale to high dimensional problems.

On the other hand, in the facet-based representation, 9 hyper-plane equations (2) are stored.

$$x<1; z<1; -x<0; -y<0; -z<0; 0.5y+z<1.5;$$
$$x+0.5y<1.5; 0.5y-z<0.5; -x+0.5y<0.5 \quad (2)$$

Although this representation saves from storing edge relationships between vertices, there are better ways to store it. In such cases, a single extruded point can result in the need to store multiple extra planes. If, instead of storing 9 hyper-plane equations, five hyper-plane equations are stored of the cube and one vertex A, storage for the polytope can be saved. As a result, the present invention focuses on the half plane representation, but the ideas extend to the other representations also.

A simple example of a table specified in the half-plane representation, in the constraint database is shown in the table 1 (Annexure). The table has polytopes C0, C1, and C2, stored row-wise. The name of the polytope is used as a unique key for identifying the polytope and thereby enables standard database operations such as sorting, standard joins, etc. The column of constraints is the matrix Ax of the constraints of type Ax<=b which defines the polytope. The column b represents the right hand side of the constraint equation. The objective is the right hand side used for the case of the dual of the polytope. The variables column defines all the variables used in the polytope. C0 and C1 are specified by the matrix A, and right hand side b (structural representation) in the table 1, polytope C2 is constructed from the intersection of C0 and C1. Such a representation is an example of the synthetic database structure.

Every database table has a metadata associated with it called the I-structure, which helps to speed up the queries. This I-structure is a graph, which maintains the subset-intersection-disjoint relationships between all the constraints and polytopes in the table. I-structures can be partially or fully populated and/or purged depending on usage of its constituent nodes/edges, using a method such as purging least-recently-used (LRU) nodes/edges.

Figure 3:
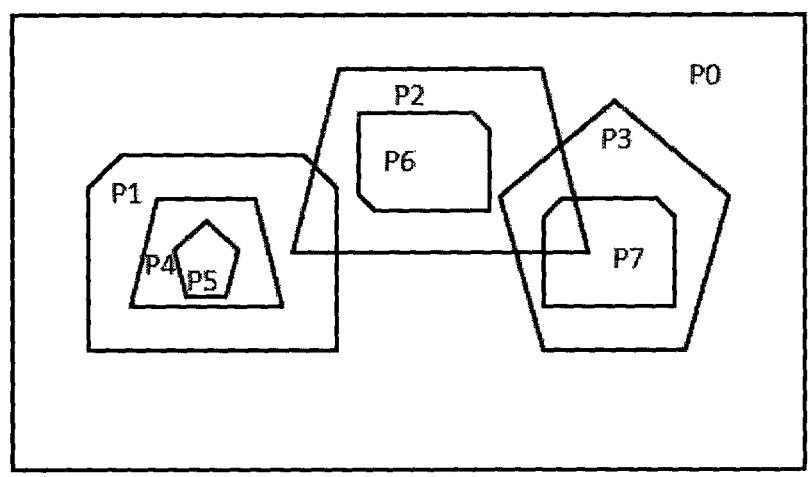
FIG. 3 illustrates the subset-intersection-disjoint relationships among 8 polytopes in a database table.

FIG. 3 illustrates the subset-intersection-disjoint relationships among 8 polytopes in a database table. It is considered as a simple example of polytopes, where P0 is a polytope that behaves like a bounding box for other polytopes in the database table or P0 is the superset of all other polytopes. P0 is formed from atomic constraints C1, C2, C3, C4' and C5, shown as dotted lines in FIG. 4. The first level of subset nodes of P0 are added as its child nodes. Note that any subset of polytope P0 satisfies all the constraints of P0 and at least one more constraint. However, some or all of the constraints of P0 may become redundant for the subset. These constraints are not shown in FIG. 4 in order to avoid cluttering. Each of the child nodes in one level are called sibling nodes as they only share an intersection or disjoint relation with each other and no subset relation exists between them.

Hence, the child nodes of P0 are P1, P2 and P3. P1 further has two subsets P4 and P5. P2 has subset P6 and P3 has subset P7.

Figure 4:
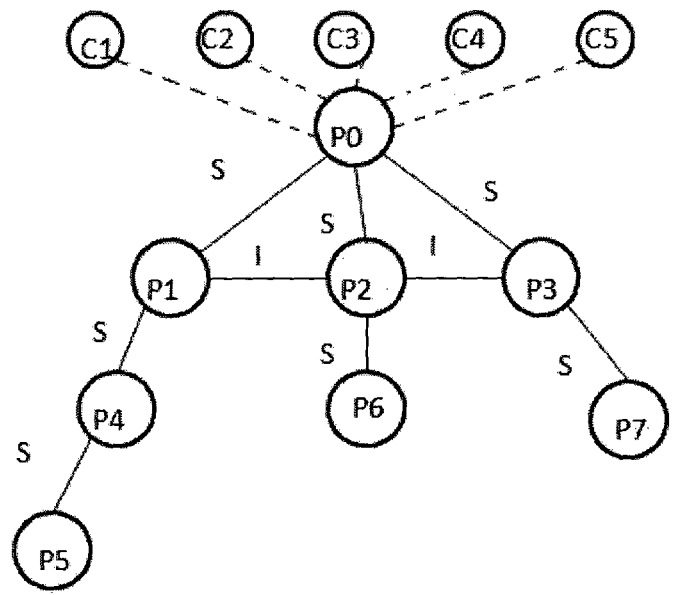
FIG. 4 illustrates the I-structure for the polytopes shown in FIG. 3.

FIG. 4 illustrates the I-structure for the polytopes shown in FIG. 3. The disjoint links are not shown in the figure. The links named as T is an intersection link and the ones named as 'S' is a subset link. A new polytope addition to the database table would require the addition of a new node into the I-structure. The I-structure is traversed in either breadth-first or depth-first manner. The relationships are checked and the new node is inserted. Deletion of a polytope/node will require just re-alignment of links. But however, if the root node or P0 is deleted, then tree re-balancing techniques should be employed. I-structures typically act like indices and aids in faster query execution.

In the I-structure mentioned above, the relationships are shown for all the nodes [2]. Essentially, the individual node relationship, will allow users to browse through any preferred node/polytope and see its relationship with the other nodes/polytopes. Thus, the polytope browser helps to see relationships for any particular node or set of nodes, and the others are not displayed (greyed out as is known in the state-of-art) [2].

Figure 5:
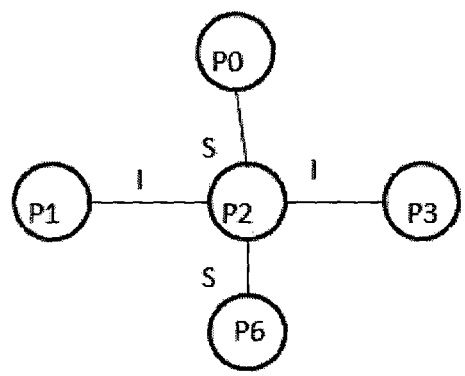
FIG. 5 illustrates the I-structure for one of the polytopes P2 in FIG. 3.

FIG. 5 shows such a relationship only for polytope P2.

Random Generation of Polytopes

A random polytope generator is used to create a large number of polytopes to be inserted into the database. The polytope generator creates polytopes which are completely disjoint from each other, which have subset relationships in a hierarchical chain or a tree and mixture of subset and intersecting polytopes represented by an acyclic graph. First a polytope is created by creating a random set of constraints—C0, C1, C2 . . . Cn. a bit vector of length N is maintained for this polytope, where N is the number of constraints in the polytope. For the first polytope, the bit vector is initialized to all zeros. A new set of polytopes from this polytope can then be created in the following manner. A new polytope is created by changing the first constraint (reversing inequality and adding an epsilon number to the right hand side. Eg. A constraint 3x1+4x2>=100 can be changed to 3x1+4x2<=102, this will give an intersecting polytope. If the constraint is changed to 3x1+4x2<=98, this will give us a disjoint polytope) and flipping the first bit in the bit vector to 1, indicating that the corresponding polytope was formed by changing the first constraint in the original polytope. The next polytope is created by changing the second constraint. For the second polytope, the bit vector will be different in the second place. In the same manner, for every constraint a new polytope is created. For subset polytopes, a new constraint will be added in such a way that the constraint region has been reduced. The bit vector will have 1's in places corresponding to the changed constraints. Since the bit vector has N bits so upto $2^N$ new polytopes can be generated from any given polytope, some of which may be infeasible or unbounded. These polytopes can even be rotated to get more examples. Constraints added in this manner can create a hierarchical chain of polytopes as well as a tree hierarchy. A graph structure of intersecting and subset polytopes can be created by creating completely random polytopes with a mix of the above mentioned subset algorithm.

Another way is just to use the polytope transformations—translation and rotation—to get new polytopes from old ones. For example, Ax<=b becomes Ax<=b+k*Delta. For a large Delta (greater than polytope diameter), and k=0, +/−1, +/−2, . . . , we can generate an infinity of disjoint polytopes.

Figure 6:
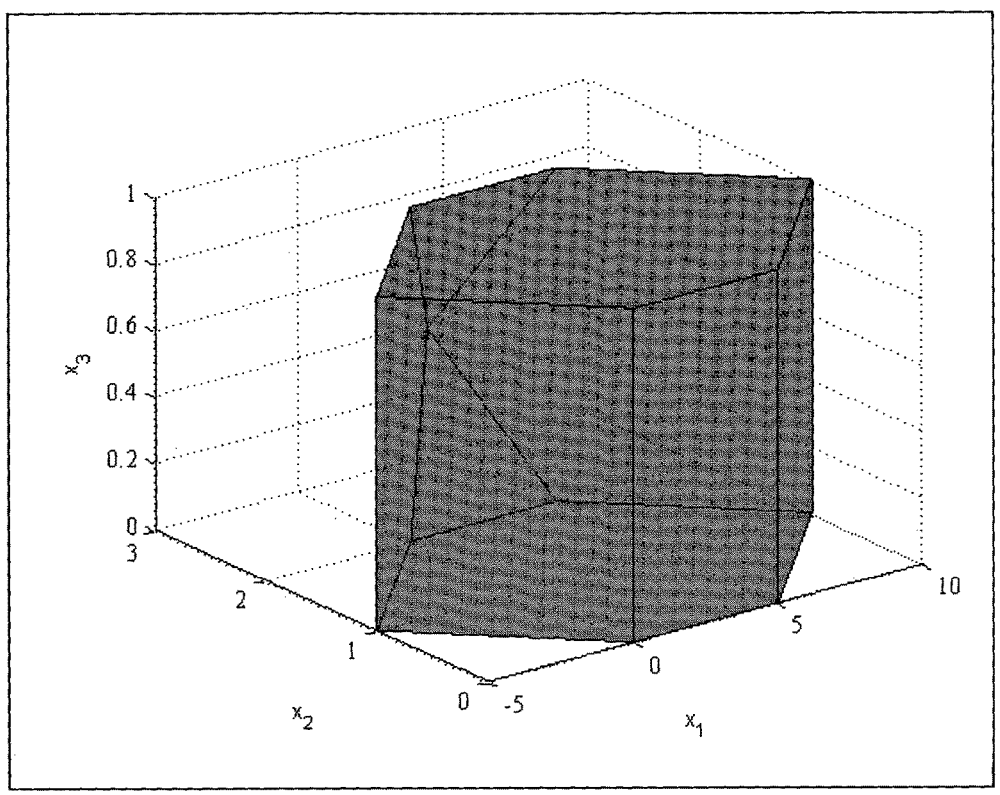
FIG. 6 illustrates random generation of $2^N$ polytopes from a given polytope

Constraints on the generation of polytopes can be provided in the form of required volume, condition number etc. Thus, we can ask to generate a set of polytopes which are disjoint/subsets/ . . . etc, but which have a given volume and condition number. For volume, we can begin with a hypercube, and then distort it using linear transformations. For getting the condition number, we could take the SVD, and scale the singular values So in summary, the data generation engine of the database can 1. Predict constraints from old data
2. Generate random constraints
3. Generate random polytopes as per a given disjoint/subset/intersection spec
4. Generate random polytopes as per a given volume/information content
5. Generate random polytopes as per a given condition number
6. Rotate, scale, and distort polytopes This is illustrated in FIG. 6.

Constraints/polytopes can be buffered in order to make I/O highly efficient. The buffer cache will keep those constraints/polytopes frequently being used and remove the unused ones using LRU. Null polytopes (i.e. infeasible LP's) can be identified and those combinations of constraints are marked as infeasible in a list or array (for small number of Nulls). The relevant portion of the I-structure can be kept in memory, and swapped in or out as per usage. For frequently used polytopes, a number of interior points and boundary points/vertices can be kept in memory and these can be swapped in or out as per usage.

Also, pointers are maintained between the polytope and its constituent constraints. Likewise, every constraint will point to all those polytopes which contains it. For example in FIG. 18, constraint C1 has pointers to polytopes X1 and X3 which are composed of constraint C1. This allows garbage collection to be performed easily. Once C1 is deleted, all polytopes dependent on C1 are marked for deletion, using one of the standard algorithms such as the mark-and-sweep algorithm. In the case of the I-structure, all polytopes which contains constraint C1 and its subsets can be deleted.

Deletion of constraints or polytopes will be allowed only depending on the application. Most applications only support generation of new constraints or polytopes. In such cases, deletion will be restricted to temporary in-memory copies. Note, that the database could either be in-memory or disk-resident and the services can be delivered as a web service, a DLL, or even an application-specific-integrated-circuit (ASIC). Also, the I-structure can be generated right at constraint generation time—since we have constructed these polytopes to be disjoint/subset/—no linear programming operations are needed Polytopes—Basic Relational Operations:

The basic relational operations are membership, subset, disjoint, intersection, union, and the contents therein are incorporated by reference [2].

Polytopes: Basic Transformation Operators:

The constraint set, which belongs to a convex problem with linear constraints, always forms a convex polytope.

A variety of applications need efficient methods to change the shape of the content without affecting the information content of the polytope. Also, non-linear transformations or affine transformations can be tried in place of linear transformation to get more variants of information equivalent polytopes and queries to handle such transformation.

The linear transformations such as scaling, distortion and rotation operations to get different sets of constraints are described further:

Scaling

Scaling operation of the polytope helps in distorting the shape of an object along an axis. To keep the volume constant, it is necessary to scale down with the same percentage along some other axis.

Method 1: Linear Scaling (Constraints Set File)

BEGIN

1. Ike-processing the constraint file:
   Constraints set stored in file will be in Hx≤K format. The value of H is added in H matrix and that of K is added in K vector.
2. Two axes are chosen. Then, one axis is scaled up by percentage p and another is scaled down by p.

$$H_{scaled}(i,m-1)=H(i,m-1)/(p/100) \quad (A)$$

$$H_{scaled}(i,n-1)=H(i,n-1)*(p/100) \quad (B)$$

Equation (A) is for incrementing and equation (B) is for decrementing it. Note that p is same for both (A) and (B) to keep the volume constant. In both the equations, i represent each row of the H matrix.

3. $H_{scaled}$ matrix and K vector is written back to a file in required format.

END

Step 1 takes $O(2n)$ time since it reads the file twice. First time, file is parsed to get the variable list and second time to read the actual content which is of the format Hx≤K and write it into H matrix and K vector. Step 2 takes $O(n)$. Since writing back the matrix H and the vector K to a file will take $O(n)$, the whole method works in $O(4n) \approx O(n)$ time including file I/O.

Figure 7:
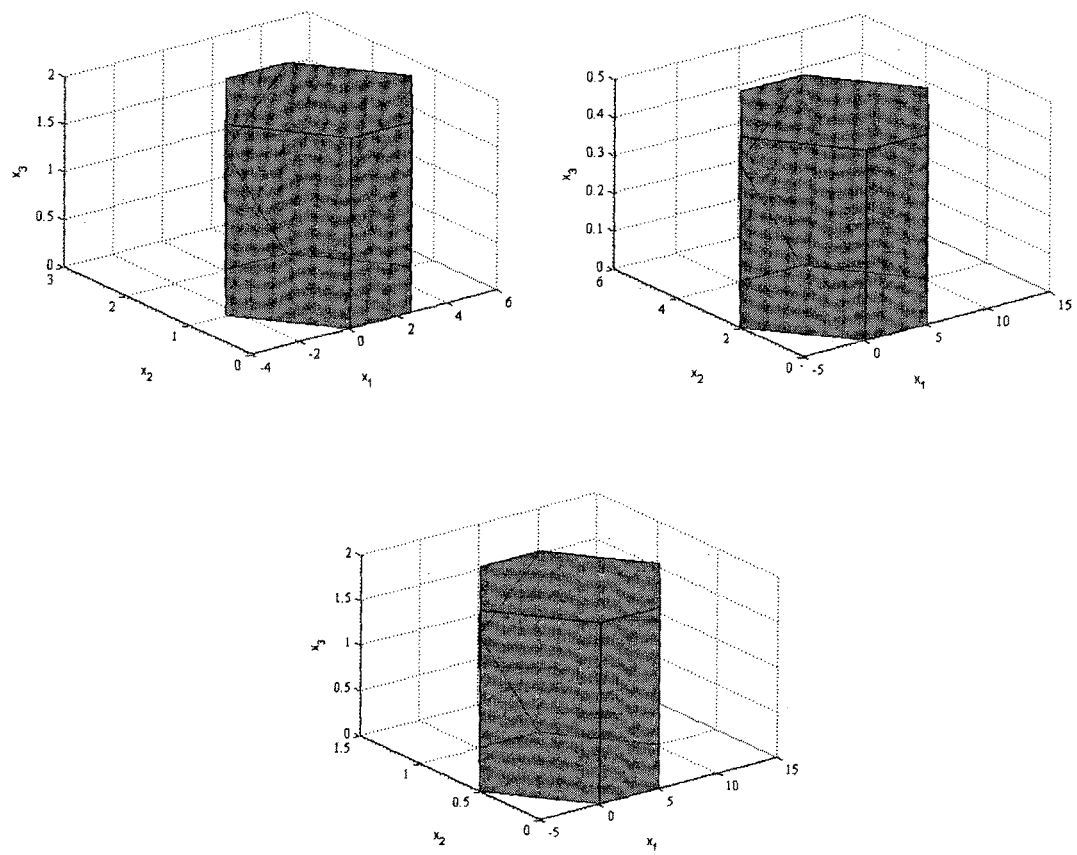
FIG. 7 illustrates input 3Dimensional polyhedron.
Figure 8:
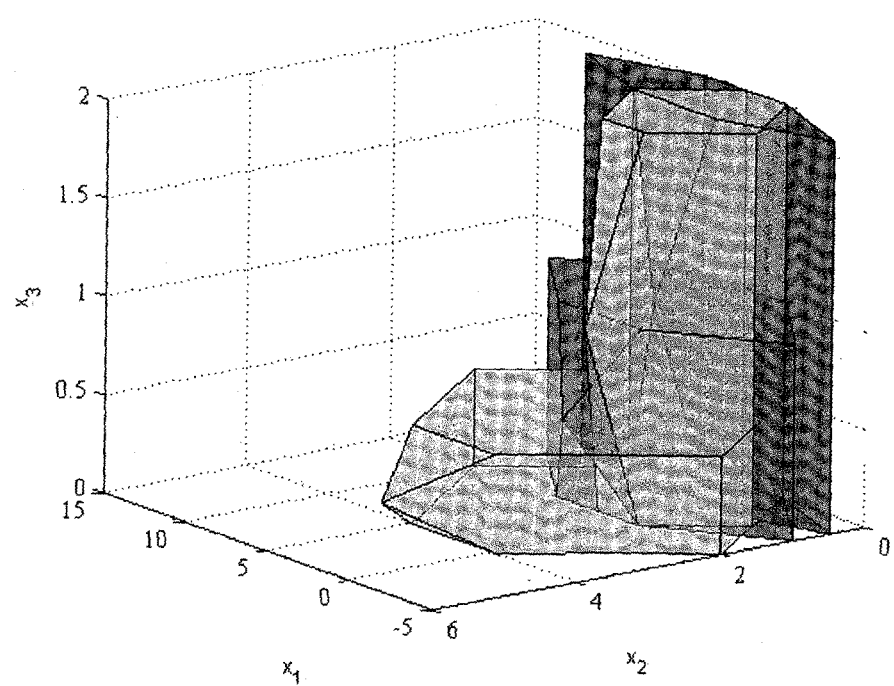
FIG. 8 illustrates scaled polyhedrons along X, Y and Z axis respectively.
Figure 9:
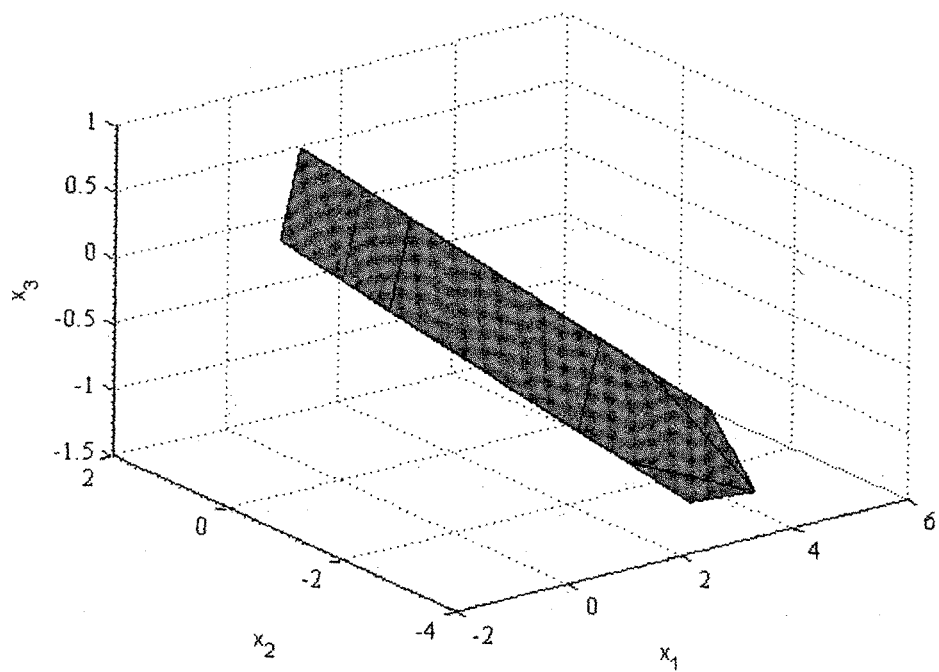
FIG. 9 illustrates input shape along with transformed polyhedrons.

This is illustrated in FIGS. 7, 8 and 9.

Distortion

The distortion of geometric models in 3Dimensional has been extensively studied for number of fields such as computer animation, gaming, etc. This work concentrates more on the space distortion along some axis in high dimensional (more than 3 dimensions) space. For simplicity, this work concentrates on linear distortions, which preserve the information content, or change it in a controlled manner.

Distortion can be achieved by multiplying the H matrix with a random square matrix. To keep the volume and information content constant, the determinant of the random square matrix should be ±1. The method is explained below:

Method 2: Distortion (Constraints Set File)

BEGIN

1. Pre-processing the file:
   Constraints set stored in file will be in Hx≤K format. The value of H is added in H matrix and that of K is added in K vector.
2. The (d×d) matrix M with normally distributed pseudorandom numbers is generated (where d is dimension).
3. If determinant (M)<0
   The sign of the first column of the M is changed
   The sign of determinant is changed.
   Done
4. M=(determinant^(-1/d)*M (Now, determinant(M)=1)
5. The $H_{distorted}$ is generated by scalar matrix multiplication of H and M.
6. $H_{distorted}$ matrix and K vector is written back to a file in required format.

END

This method changes the shape of the polytope by random distortion. It also rotates the shape randomly.

Figure 10:
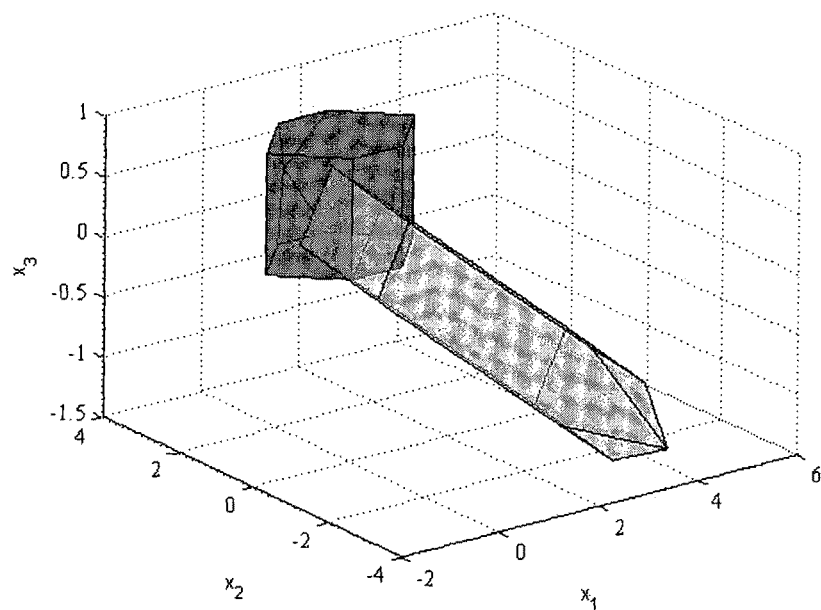
FIG. 10 illustrates distorted polyhedron.
Figure 11:
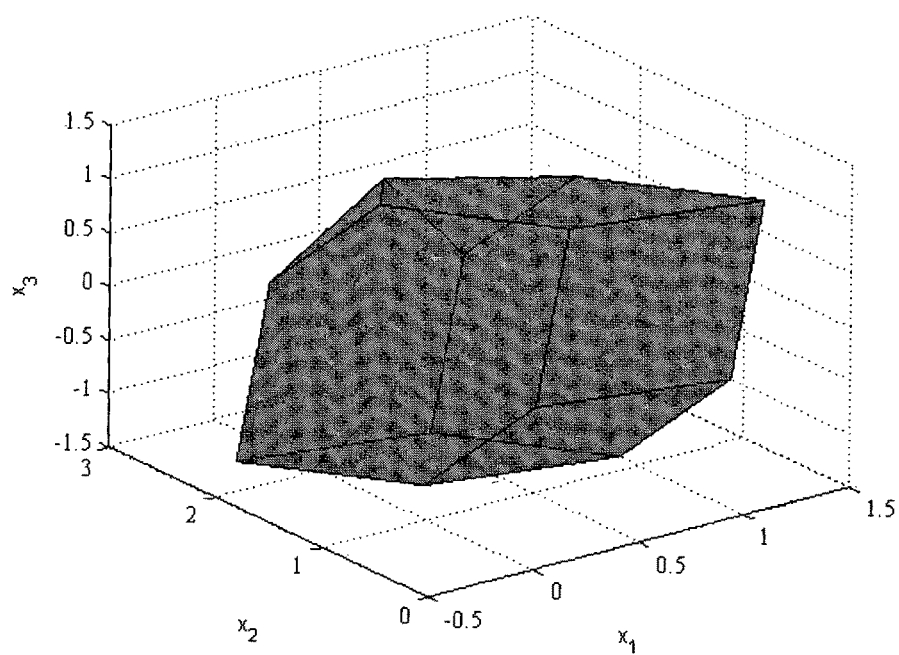
FIG. 11 illustrates input and distorted shapes.

This is illustrated in FIGS. 10 and 11.

Rotation

Another type of geometric linear transformation includes rotation. This section describes how to rotate a shape without distortion. The rotation method works as explained below:

Method 3: Rotation (Constraints Set File)

BEGIN

1. Pre-processing the file:
   Constraints set stored in file will be in H$x \leq$K format. The value of H is added in H matrix and that of K is added in K vector.
2. A matrix M is generated, which is a rotational matrix or an orthogonal matrix.
3. The H$_{rotated}$ is generated by scalar matrix multiplication of H and M.
4. H$_{rotated}$ matrix and K vector is written back to a file in required format.

END

Figure 12:
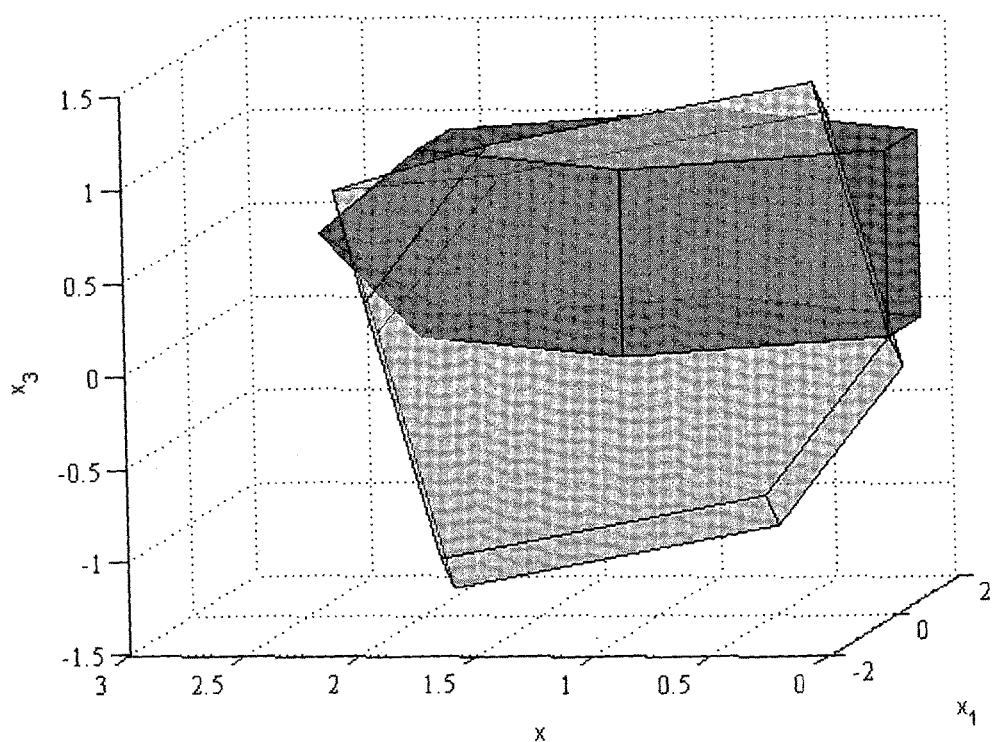
FIG. 12 illustrates rotated polyhedron.
Figure 13:
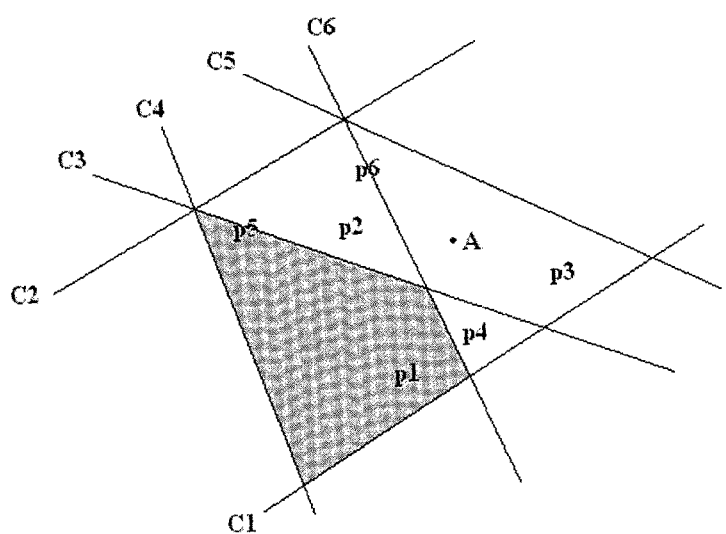
FIG. 13 illustrates input polyhedron and rotated polyhedron.

This is illustrated in FIGS. 12 and 13.

Relational Algebra for Convex Polytopes

A relational algebra for convex polytopes can be formed based on the basic operations, following our earlier patent application "Decision Support . . . ", and "Computer Implemented . . . ". The queries can be selected based on these basic operations. Since here high dimensional data are dealt with, indices as used in GIS systems do not work well. To answer relational queries, a linear scan using the above operators can be used, together with the I-structure.

The select queries and the algorithms for basic operators are discussed in the following sub-sections:

Select Queries

Select queries can range from finding union of N polytopes to intersection of N polytopes. The select queries work on the information already existing in the database.

Figure 14:
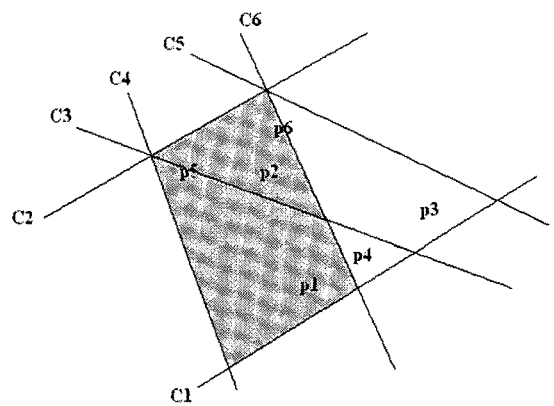
FIG. 14 illustrates point membership with a polytope.
Figure 15:
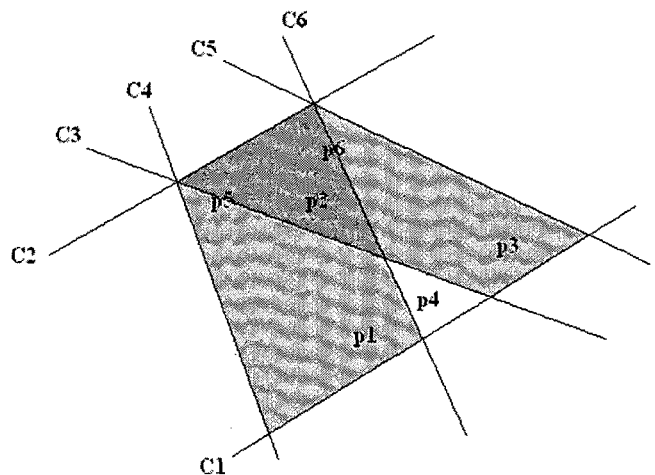
FIG. 15 illustrates subset of polytopes.
Figure 16:
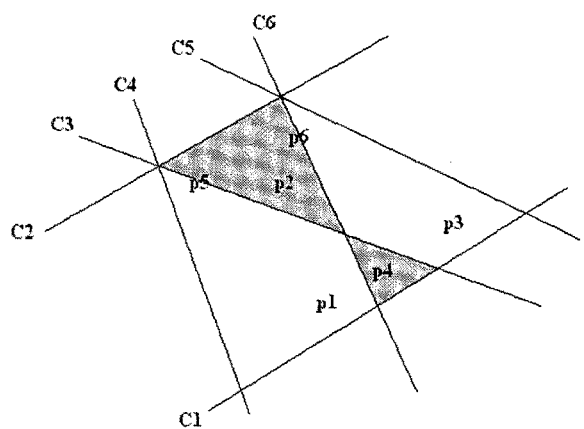
FIG. 16 illustrates intersection of polytopes.

FIGS. 14, 15 and 16 illustrate queries to determine all polytopes intersecting, disjoint from, or subsets of a given polytope P. Query on a polytope means determining a polytope, which satisfies conditions specified in the query. For example, such a query can be used to find a polytope, which is a subset of a polytope and intersects with a few other given polytopes. For instance, with reference to the FIG. 16, the query can be used to find the intersection of polytopes p5 and p6.

The database will store the queries and their results. Thus, if a similar query is run, then the database will produce the result faster. Also, the storage of the query results in the database will help to solve different queries, using the I-structure if needed.

Basic Relational Operators

To perform fundamental set-theoretic operations of polytopes—pair wise intersection, subset and disjoints and their generalizations are evaluated for multiple polytopes [1]. If P and Q (Pc and Qc are the complement of the sets P and Q) are two sets, then, following [1]:

1. If P ∩ Q=φ, then P and Q are disjoint
2. If P ∩ Qc=φ and Q ∩ Pc≠φ then P is a proper subset of Q
3. If Q ∩ Pc=φ and P ∩ Qc≠φ then Q is a proper subset of P Based on the assumptions mentioned, the below method 4 is formed:

Method 4: Subset, Intersection and Disjoints Among Convex Polytopes

1. Two constraint sets at a time (say P and Q) re taken.
2. The linear inequalities from both P and Q are combined to form a new set R and checked feasibility using an LP Solver
3. If R is infeasible then P and Q are disjoint sets, the process is stopped or else, continued.
4. Each inequality from set P is taken, the inequality sign is reversed and added to set Q, to form a set Q'.
5. The feasibility of set Q' is checked at step 4.
6. If Q' is infeasible for every inequality added from P to Q with inequality sign reversed then Q is subset of P.
7. If Q' is feasible for at least one inequality added from P to Q, then each inequality is taken from set Q, the inequality sign is reversed and added to set P, to form a set P'.
8. The feasibility of set P' is checked at step 7.
9. If P' is infeasible for every inequality added from Q to P with inequality sign reversed, then P is subset of Q
10. Again, if feasibility exists for at least one inequality, then P and Q intersect each other.

The order of the method is O (m+n) calls to a linear programming (LP) solver, with m and n being the number of linear inequalities in the two constraint sets P and Q respectively. If there are p constraint sets, then the order of the method will be O ((m+n)p$^2$) to check the relationship between all pairs. Using special structure in the constraints, incremental linear programming and the use of caching on priority basis can speed up the method.

Additionally, it is noticed that in this process, using the linear program:

In case of disjoint operator, we can find a separating hyperplane.

In case of intersection, we can find a point feasible to both

In case of subset, we can find points in the subset common to both and the superset not in the subset Subset calculation is the most expensive among the three set operations and an improved method is presented below and illustrated in FIG. 17.

Figure 17:
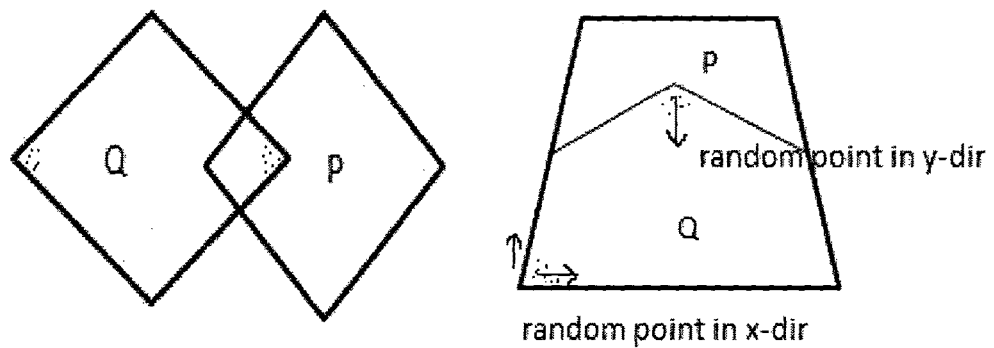
FIG. 17 illustrates method 1 when random points sampled around extreme points when subset relation does not exist and when subset relation exists.

FIG. 17 illustrates Method 5 when random points sampled around extreme points and subset relation does not exist and when subset relation exists. The idea is to determine an extreme vertex of the intersection polytope P1∩P2 and randomly sample around it. If Q is not a subset of P, with high probability, a point will be found feasible for Q but not P.

Method 5: Boundary Points Sampling for Determining if Q is a Subset of P.

1. The random extreme points are found for the polytope enclosed by Q, for example by minimizing over the sum of all the variables.
2. For each of the random extreme point generated, step 3 is performed.
3. The extreme point is perturbed along any random direction with a ε length perturbation.
4. The new perturbed point is checked if it is feasible in Q. If it is feasible in Q, then step 5 is followed, else step 3 is followed.
5. The new perturbed point is checked if it is feasible in P. If yes, then step 4 is repeated, at most K times. Else Q is not a subset of P, stop.
6. If in K trials, it cannot be established that Q is not a subset of P, the direct method is tried.

The above method converges to a solution much faster especially in situations when the polytopes are not a subset—a single perturbed point is typically sufficient. Even when subset relation exists, it is comparable to runtimes of the previous method.

Thus, a query to find which of the polytopes in Database X is a subset of polytope A can be speeded up by first checking which among the 'n' polytopes in the database are disjoint from A by using the part of the method 4 that checks for level of disjointness. If 'p' polytopes are disjoint from polytope A, then n-p polytopes are run through the method 5 to check if a subset exists. This method is faster to find if they are not a subset and if they are only intersecting. If it is not found that they are not a subset in 'm' number of sample tries, then the method is stopped and the expensive subset part of method 4 is run to find the solution. When the method is run in this order on the database, a saving of 70% of time is observed.

Expressions of the form P1∩P2∩P3 formed using the synthetic representation of polytopes, where P1, P2 and P3 are polytopes from a table, where the results of the first intersection operation is given as input for the second one, need not require intersection of every polytope with every other polytope. Rather, the above mentioned methods, the I-structure and incremental linear techniques can be used here to provide faster results. This applies to expressions involving subset operations too. More detail is given in the section on "Synthetic Representation".

Discrete Variables and Set Theoretic Relations

Evaluation of operators, while already a heavyweight operation with continuous variables (needing linear programming), becomes computationally intractable in the worst case with discrete variables. For simplicity, the case below is dealt with where the variables are integers, constrained to lie within the boundaries specified by (linear) constraints. As such the constraints specify a convex body enclosing all the integer points. In general, this will not be the convex hull of the integer points—the latter typically needs an exponential number of constraints to specify. It is that the number of enclosed points N is too large to enumerate (else operator evaluation can be done in O (N) time by enumeration).

1) Checking whether two integer polyhedral sets are disjoint tests the feasibility of the joint ILP satisfying both constraints—this is NP-hard.
2) Checking whether one integer polyhedral set is a subset of another or not also amounts to testing for feasibility of a joint ILP, and is also NP-hard.

Figure 18:
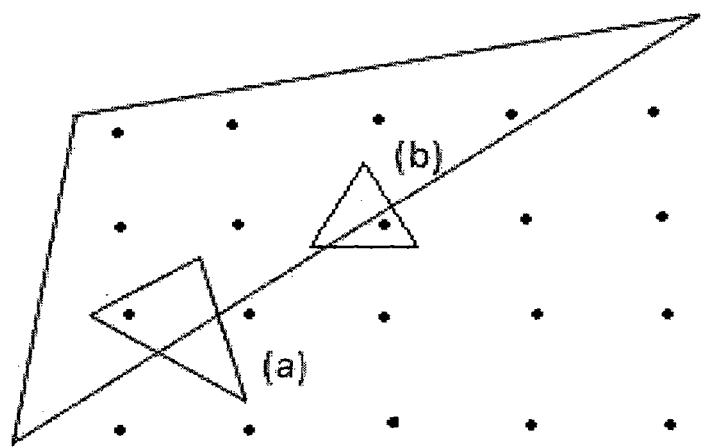
FIG. 18 illustrates intersecting integer polyhedral sets.

FIG. 18 illustrates the heuristic approach and shows different intersecting integer polyhedral sets. To find if they are intersecting, first it is checked, if their LP relaxations are disjoint. If yes, then the two polyhedral sets are disjoint and not intersecting. But, if the LP relaxation is not disjoint, then it has to be checked if there is an integer point in the intersection of the feasible regions of the two polyhedral sets as in the case of FIG. 18 (a) or if no such point exists as in FIG. 18 (b). The present method involves invoking an ILP (Interior Linear Programming) solver driven by a modified version of method 4 or method 5. Instead of using a ε-neighbourhood, the binding constraints is determined (constraints satisfied as equalities) at the extreme points and successively negated to determine a point feasible in one but not the other (Method 3). Note that, instead of LP relaxations, other convexifications—e.g. a minimum bounding rectangle, convexifications by using semi-definite-programming as used exemplarily in the Max-Cut method of Geomans-Williamson ['Improved Approximation methods for maximum cut and satisfiability problems using semidefinite programming'—Journal of the ACM (JACM) 42(6) 1115-1145], etc can also be used.

Method 6: Discrete Disjoint/Intersection/Subset
1. Two integer constraint sets are taken at a time, say P and Q for checking if Q is a subset of P.
2. The constraints from P and Q are combined to form a set P' and solve the LP relaxation of P' to get random extreme points, for example by minimizing over the set of all variables.
3. The extreme point obtained in step 2 is used to find the binding constraints for P and Q.
4. Each binding constraint of P is negated and added to the binding constraint of Q to form a set Q'.
5. The ILP Q' is then solved. If Q' is infeasible for every constraint added from P to Q with inequality sign reversed then Q is subset of P. Stop.
6. If Q' is feasible for at least one inequality added from P to Q, then P and Q intersect each other.

For a 20 variable polytope with 50 constraints and a database with 4 such constraint sets, the above method takes approximately 68 ms when they intersect and no subset exists and 376 ms when subset exists between them.

We describe queries using transformation operators below:

Queries for Transformation Operators

Scaling Query

This query gives all the polytopes which are in scaled form of the given polytope. This is the reverse operation of scaling method which was explained earlier. Inputs to the system are two H matrices of 2 polytopes. If one of them is a distorted form of the other, it returns true, else it returns false.

Method 7: Scaling query (H1 and H2)
BEGIN
1. Both H1 and H2 are checked if they have same number dimension and same number of faces.
   If TRUE the process is continued, else the condition is considered as FALSE.
2. The contents of any two columns of H1 are checked if they are in scaled form of the same columns of H2. If so, the condition is considered as true. Otherwise the condition is considered as false.
END This method works in O(m*n) where m*n is the dimension of the matrices H1 and H2. P is the percentage at which other polytope is distorted with respect to first polytope.

Rotation Query

This query gives the rotated polytopes of the given input polytope, which are stored in the database. While rotating a geometrical object, the H matrix of the polytope is multiplied with an orthogonal matrix. Here, the operation is reversed. i.e.

$$H*O = H_{rotated} \quad (7)$$

$$\text{So, } O = H_{rotated} * H^{-1} \quad (8)$$

If the resultant matrix is orthogonal, then the polytopes are rotated versions of each other.

Method takes H matrices of both the polytopes and the condition is considered as true if one is the rotated form of the other and false otherwise.

Method 8: Rotation Query ($H_1$ and $H_2$)
BEGIN
1. It is checked if both $H_1$ and $H_2$ have same number dimension and same number of faces.

If TRUE the process is continued, else the condition is considered as FALSE.
2. The inverse of $H_1$ is taken and multiplied with $H_2$.
3. If the resultant matrix O is a square matrix, it is checked if $O^T = O^{-1}$. If it is true the condition is considered as true. If it is not a square matrix, calculate the pseudo inverse of O is calculated by $$O^{-1} = (H_1^T * H_1)^{-1} * H_1^T * H_2 \qquad (9)$$

4. If O is not orthogonal, $3^{rd}$ step is repeated by taking inverse of $H_2$ and multiplying it with $H_1$.
5. If O is still not orthogonal, the condition is considered as false.
END In step 3, when there is an equation: Ax=b, and A is not square matrix, the inverse of a non square matrix cannot exist because $A^{-1}$, the inverse of A, must satisfy $A^{-*}A^{-1} = A^{-1}*A$. However, the condition of A being non square is impossible because the two expressions have different dimensions. While a true inverse does not exist, there are techniques that are frequently used to give a least squares best estimate for such problems.

The most common solution is obtained by $$X^{-1} = (A^T * A)^{-1} * A^T * b \qquad (10)$$

This does not always work since $A^T*A$ may have zero Eigen values (primarily occurs when rows of A are less than columns of A).

Distortion Query

This query gives the list of all distorted polytopes of a given polytope, which are in memory. Distortion method works with the random square matrix with the determinant 1. Hence, the query method includes finding the matrix and determining the determinant of that matrix. If the determinant is 1, then the polytope is the distorted form of the given polytope. Detailed method is explained below.

Method 9: Distortion Query ($H_1$ and $H_2$)
BEGIN
1. It is checked if both $H_1$ and $H_2$ have same number dimension and same number of faces.
   if TRUE the process is continued else the condition is considered as FALSE
2. The inverse of $H_1$ is taken and multiplied with $H_2$.
3. If the resultant matrix M is a square matrix, the determinant of M is calculated. If it is 1 the condition is considered as true. If it is not a square matrix, the pseudo inverse of M is calculated by $$M^{-1} = (H_1^T * H_1)^{-1} * H_1^T * H_2 \qquad (11)$$

4. If M's determinant is not 1, $3^{rd}$ step is repeated by taking inverse of $H_2$ and multiplying it with $H_1$.
5. If M's is still not 1, the condition is considered as false.
END Queries for Synthetic Representations The method discusses the condition when the polytope is specified as a combination of other polytopes or constraints, using intersection operators. The specification of the combination avoids the repeated use of linear programming/integer linear programming—instead the I-structure can be used:

When the synthetic structure of the polytope is specified, methods similar to query optimizations in classical databases can be used and these are outlined below. A synthetic representation example of the database structure is shown in FIG. 19.

Figures 19, 20:
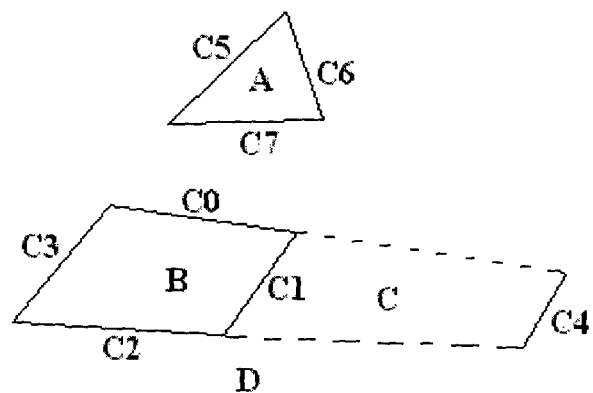
FIG. 19 illustrates synthetic database structure.
FIG. 20 illustrates constraint sets.

FIG. 19 illustrates synthetic database structure. It has constraints C0, C1, C2 . . . Cn in it and has N polytopes built from set operations on these constraints, such as intersection of constraints, together with a fully or partially completed I-structure associated with it. If only the right hand sides and the senses are different, then they are parallel to each other and disjoint. In every other case, the two constraint planes will intersect. Comparing sets of K constraints sets with each other is an order ($N^{2K}$) operation, but is feasible for small K and can be speeded up using dynamic and incremental linear programming. These results along with inferences from the I-structure can be used for fast query handling. For example, let us say the database consists of 3 polytopes with the following construction in increasing order of number of constraints.

$$X0 \leftarrow C4 \cap C6$$

$$X1 \leftarrow C1 \cap C2 \cap C3$$

$$X3 \leftarrow C1 \cap C2 \cap C3 \cap C6 \qquad (12)$$

Let us assume that C4 is disjoint from C1, C2 and C3 and C6 is disjoint from C1, C2 and C3. Two inferences, using the I-structure which can be made are that X3 is a subset of X1 (implicit) and X1 is disjointed from X0. These inferences can now be used in query execution. For example, a query to find which the polytopes of which W are is a superset where W has the construction $$W \leftarrow C1 \cap C2 \qquad (13)$$

can be quickly returned using the inferences. W and X0 are disjoint because C4 is disjoint with C1 and C2. Then W and X1 are checked to see if W is a subset of X1. Since this returns a true, it is inferred from the information that we have, that W is also a superset of X2. In the initial implementation, for a polytope with 100 variables and 200 constraints, the subset check with method 1 takes 348 ms. So in all the total execution time is 328 ms as against 696 ms if a subset check should have been performed for W with X2 also (50% speedup).

FIG. 20 illustrates constraint sets. Another example is illustrated in FIG. 20. As seen below:

$$A = C5' \& C6 \& C7$$

$$B = C0' \& C1 \& C2 \& C3'$$

$$C = C0' \& C4 \& C2 \& C1'$$

$$D = B \cap C = C0' \& C4 \& C2 \& C3'$$

Clearly, from FIG. 20, we get, A and B are disjoint from one another.

$$\text{That is, } A \cap B = \emptyset \qquad (14)$$

$$\text{Also, } D = B \cup C \qquad (15)$$

Now, omitting one constraint C1 from polytope B and adding another constraint C4 forms a polytope D.

Constraint C0 and polytope A form an infeasible region and hence any polytope, which includes constraint C0, will be disjoint from polytope A. Storage of the LP bases associated with A will enable quick determination of such cases.

Partial Query Handling

The operator runtime varies considerably, depending on the nature of the polytopes and their mutual relationship and any convexification approximations employed. Optimizations can be made which yield partial answers. Queries to find (for example) all the subsets for a given polytope can be partially answered at high speed; by returning the ones which are not disjoint and which may possibly be a subset (depending on passing further possibly expensive checks). These partially determined answers can be used in other stages of expression query handling. The example provided below illustrates the use of partial query handling.

High Speed Joins

FIG. 21 illustrates join using common sub-expressions. Joins depending on internal structure of attributes can be greatly speeded up using common sub-expressions. Consider the following example. A join operation is performed between two tables T0 and T1, where the join attribute is intersection (i.e. rows are selected from T0 and T1, if the polytopes in those rows intersect) as shown in FIG. 21 (a). As both the tables contain three polytopes, each made from three constraints (FIG. 21 (b)), the total number of intersection operations in order to perform the join will be 3×3×2×2=36. A naive approach will thus end up solving 36 LPs. This can be considerably optimized using common sub-expression elimination (incremental LP techniques including sharing bases etc). Thus, the second part of FIG. 21 (b), evaluates $$C_{02}=C_0 \cap C_2 \qquad (16)$$

once and use it twice.

Similarly, $C_{14}=C_1 \cap C_4$ (17)

is evaluated only once.

Further, $$T_{0124}=C_{02} \cap C_{14}=C_0 \cap C_2 \cap C_1 \cap C_4. \qquad (18)$$

Once evaluated, to find the complete Cartesian product needed to find $T_{0124} \cap C_3$, $C_{02} \cap C_1 \cap C_3$ and $C_2 \cap C_3 \cap C_{14}$. This is only 8 online LP's (+1 offline LP) instead of 36—a saving of 75%. This is easily extendable to any case where the join attributes have internal structure and not just a partial order.

High Speed Method for Querying Using I-structure

The I-structure of a database table maintains the subset-intersection-disjoint relationships between the polytopes in the table. It can be used as an index for faster query results.

Method 10: High Speed Method

BEGIN
1. The process is started from root node P0 of the I-structure.
2. It is then checked if the querying polytope Q is disjoint from P0, then none of the polytopes within the I-structure is a subset. Then step 5 follows.
3. It is checked if Q is subset of P0. If yes, then depth-first search is performed through the I-structure to find all the nodes which are subsets of Q.
4. If Q intersects with P0, then breadth-first search is performed through the I-structure to find node which are subsets of Q.
5. Steps 1 to 4 are performed for a different I-structure.
END An example of the method is from FIG. 4, which illustrates the I-structure for the polytopes shown in FIG. 3.

A query to find the subsets for a polytope Q will start with a check with the root node P0 in the I-structure. If Q is a subset of P0, then the child nodes of P0, that is, P1, P2 and P3 are examined to check if they are subsets of Q and so on. The method should yield fast results especially when multiple I-structures exist and a disjoint check with the root node rules out most of the possibilities.

Query Engine—an Exemplary Embodiment of Ideas

The query engine queries the database of polytopes for a specific set of operations. This query engine supports the four basic operations on polytopes i.e., disjoint, subset, superset and intersection. The query engine searches the given database of polytopes for results with the given input. The input consists of the existing polytopes in the database, which provides the basis for the search. The search operations require the usage of method mentioned in the previous section. The query engine solves the constraint sets and finds the feasibility of the sets using an optimization engine like Cplex, Gurobi, LP Solver, etc.

The query processor can be further extended, to achieve many other commonly required problems, such as membership of a point in all the polytopes present in the database, computing the volume and information content of the polytope (which in turn decreases the time taken by query processing in shape transformation), classify polytopes based on their shape or volume only, etc.

Moreover, the database can be extended to implement the ACID properties so that changes can be made to the existing polytopes to create new polytopes and these new polytopes can be permanently stored in order to use them later. Also, this database can be made to work in multi-user environment wherein if one user is modifying some particular data, then by using the locking strategy it is ensured that the changes done are permanent and the inconsistent data will exist in the database.

Query Language

With the query engine is associated a query language to process the query engine. This query language is an SQL like language with very basic commands. It can further be extended to support more features of SQL. The query language has been built using java. The current query language supports the following commands:

Create

The create command is used to create a new database. Database in this context refers to a physical folder location where in the input files can be stored.

Use

The use command is used to make a database active for its current usage. When a database becomes active, it implies that from the next command on, that database will be accessed to solve all the queries until the next database is made active.

Let Condition be

This command does not exist in the SQL. It is specific for this sort of query engine. This command is used to specify the search criteria of the query. The search criteria set using this command is then used by the select command.

Select

This command is used to extract the solution to the search criteria specified in the 'let condition be' command.

Insert

The select command processes the user query and displays the result on the console. If the user additionally wants to store the result of the select command, then the insert command can be used.

Create View

The create view command works as an alternative to the insert command. It also stores the result of the select command into the specified existing database.

Drop

The drop command is used to drop or delete an existing database. Database in this context refers to a physical folder location. Using this command one can erase the folder as well as its contents.

Set Threads

The Set Threads command is used to set the number of threads to be executed while running the application. The number of threads set should be greater than 0. This command helps in multi-threading and hence, reduces the time taken by the query to execute.

Set Cache

This command helps in setting the cache option. It may be set to either ON or OFF state. If the cache is on, then the query searched will first be searched in the cache for the results. If query is found in cache, then the disk will not be searched for the input query. If not found in cache, the query will be searched in the database.

Clear Cache

The clear cache command is used to clear the contents of the cache. The previous contents of the cache file will be erased and new results will be stored in the cache next query onwards.

Quit

The quit command is used to exit from the application.

Load

The load command loads the database into the memory.

Unload

Unload command clears the memory from loaded data.

Database Indices

Linear search is inefficient for large databases. Hence, we need to build quick lookup data structures such that the searching takes lesser time. A database index is such a data structure that improves the speed of data retrieval operations on a database at the cost of slower writes and increased storage space. Some of the database indices of the inventions are as below:

Indices on the volume of the polytope. If the volume of the polytope can be calculated, then a data structure can be built to store the volumes of all the polytopes for quicker access to the polytopes based on the volumes.

Attributes of a given polytope. In a list of constraint sets, we can store the attributes of a polytope like storing the value of a variable.

I-structure. This is described in detail in the section on an extended example.

Figure 22:
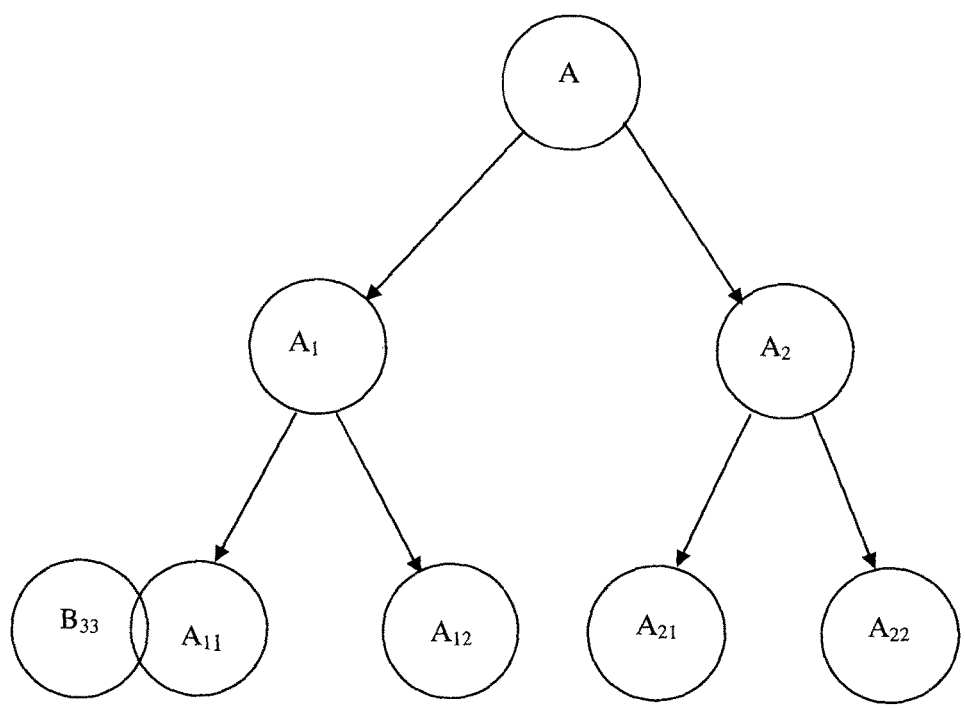
FIG. 22 illustrates polytope relationship hierarchy.

By storing these relationships, the relationships between the polytopes can be derived easily and it is much faster way. For example, in FIG. 22, $A_{11}$ is a disjoint from $A_{21}$ and subset of A. As $B_{33}$ intersects with $A_{11}$, and $B_{33}$ intersects with $A_1$ and also A. Since $A_1$ and $A_2$ are disjoint, respective subsets $A_{11}$ and $A_{21}$ are also disjoint. It also infers that, $A_1$ is disjoint from $A_{21}$ and $A_{22}$ since $A_1$ and $A_2$ are disjoint and $A_{21}$ and $A_{22}$ are subsets of $A_2$.

This pre-processing relationship of polytopes and storing the data in R-Tree or any tree data structure along with indexing will speed up the query processing to a great extent. Traditional expression evaluation methods like common sub expressions and associated dynamic programming methods known in the state of art can be used for high speed.

So far, we have discussed the relationship of constraints specified by the user, or obtained by other means. The methods in our previous patent application [2] and prior ones can be used to create new sets of constraints equivalent in volume/information content to another. Some or all of these can be stored as materialized views for fast access/query handling.

Constraint databases can even be created from traditional point specifications, by deriving constraints satisfied by the data.

Figure 23:
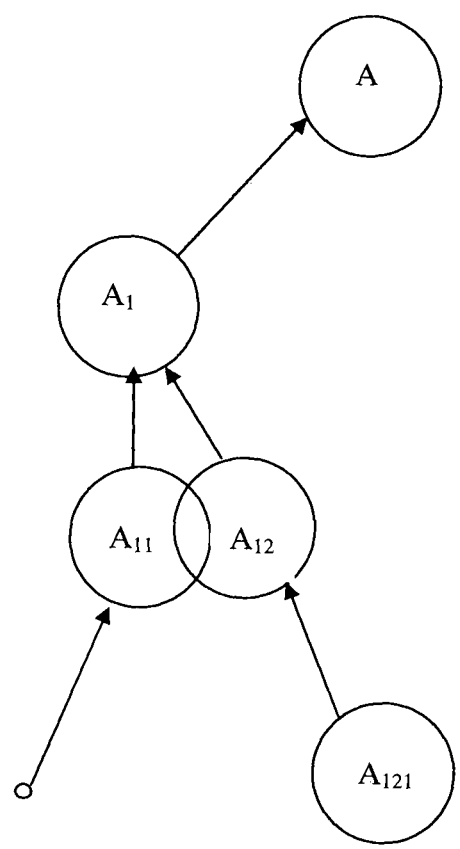
FIG. 23 illustrates construction of constraint database from traditional database.

FIG. 23 shows the construction of constraint database from a traditional database, where deterministic point specifications are replaced by constraints enclosing the points. Without prior knowledge about the kind of constraints, this is a non deterministic process. Methods specified in our previous patent application [2] and prior ones can exemplarily be used to create constraints from point specifications. This figure shows addition of a new point into the constraint set. This kind of additional points as well as new intersection operations create a new constraint database from a traditional database.

Note that this method is equally applicable for constraints having either continuous real number parameters or a mixture of continuous and discrete parameters. The volume has to be interpreted either as a continuous, discrete (counting), or mixed volume.

As an extreme example, from linguistic data, a fully specified sentence can be fully or partially "fuzzified" into a <subject> <verb> <object> classification, with constraints on which nouns can occupy the subject, which verbs are allowed, and which nouns allowed in the object. This amounts to deriving a constrained sentence template from a fully specified sentence.

An Extended Example is, a database consisting of 4 polytopes. The half plane equations characterizing each of the polytopes are listed in Annexure:

Constraint Set 1–Polytope P1 (19)

Constraint Set 2–Polytope P2 (20)

Constraint Set 3–Polytope P3 (21)

Constraint Set 4–Polytope P4 (22)

Figure 24:
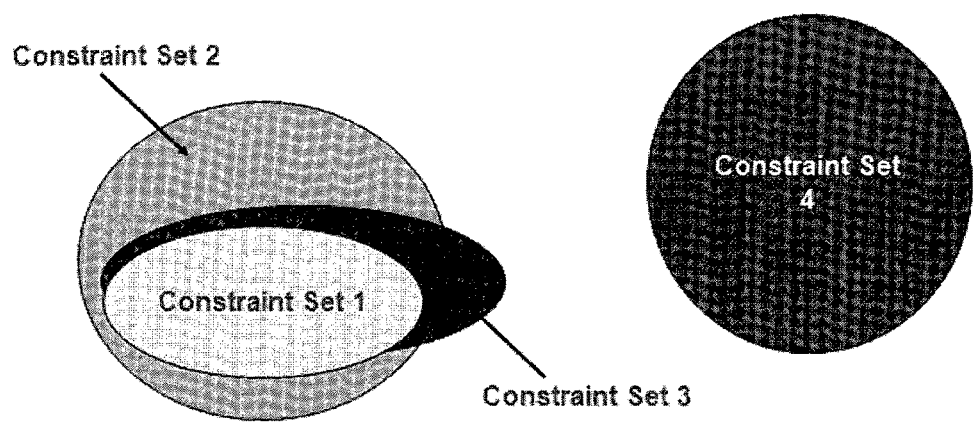
FIG. 24 illustrates the relationship between 4 constraints sets/polytopes.

FIG. 24 illustrates the relationship between 4 constraints sets/polytopes. The following relations exist between the above polytopes, which is also illustrated.

1. Polytope 1 is a subset of Polytope 2.
2. Polytope 4 is totally disjoint from Polytope 1, Polytope 2 and Polytope 3.
3. Polytope 3 intersects with Polytope 1 and Polytope 2.

The proposed constraint database can take queries from users involving such complex relational algebra operations. For example, a query to get all the polytopes that intersects with polytope 3 (or shares common assumptions in their specification) will fetch back polytope 1 and polytope 2.

Each of the above polytopes can be stored in either the primal or dual space. If two dual polytopes intersect, lower bound for both the primal problems is obtained. Query processing is made faster by considering only few of the hyper-planes of the polytopes as in method 5 and quickly arriving at the solution. In the case of discrete variables, convexification techniques such as LP relaxation are used to find a solution for an otherwise hard problem. Other faster techniques involve maintaining subset-superset relationships of polytopes in an I-structure. When the pre processing is done, a tree structure with the relationships is created which can be later used as an index for faster access. For example, such an I-structure would quickly fetch P1 as the subset of P2 without performing any LP calculation. For a database with large number of polytopes, the index structure created in this manner will produce substantial reduction in query processing time. The nodes need not be only polytopes, but any convex/non-convex bodies, maintaining subset/superset relationship. However, computation is fast at convex nodes. Also query processing time can be reduced if the different convexification approximations used are done parallelly on multiple cores.

A tuple can be materialized using only one pre-identified shape, representative of a cluster of shapes of same volume around it, being stored in the database. A number of tuples at different "orientations" will be used to represent all polytopes of the given volume. At least one member of every polytope family having the same volume, and a fixed number of faces was materialized. Hence, for example, materialization of polytopes of unit volume with 4, 5, 6, and 7 faces, and 4 materialized polytopes in all.

Any polytope of unit volume of, say, 4 faces by orthogonal transformations on the materialized polytope can be generated. The limits of validity can be calculated and stored. For example, how much a polytope can be rotated so that its subset relations still hold the same.

To illustrate all these features, a simpler example is given in Tables 2a-2f (Annexure) for constraint sets (Set 1-Set 6) in 2 variables.

Figure 25:
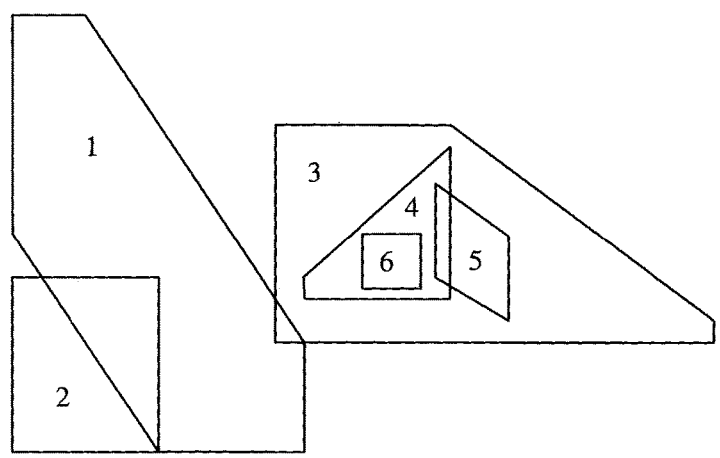
FIG. 25 illustrates the subset-intersection-disjoint relationship between 6 different constraint sets/polytopes.
Figure 26:
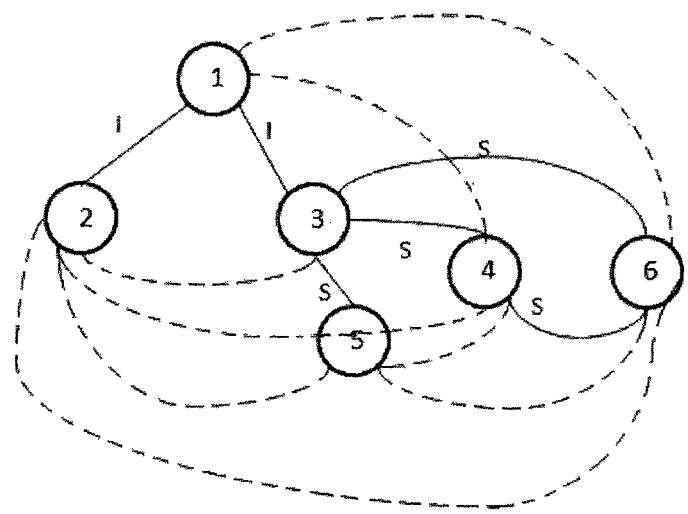
FIG. 26 illustrates the graph structure formed for maintaining subset-intersection-disjoint relationships among the 6 polytopes of FIG. 25.
Figure 27:
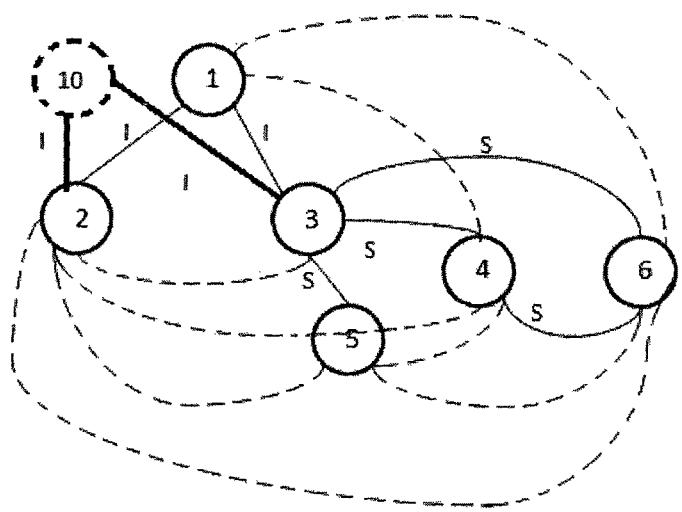
FIG. 27 illustrates the graph structure formed for maintaining subset-intersection-disjoint relationships among the 6 polytopes of FIG. 25 and the enclosing set of polytope 1.
Figure 28:
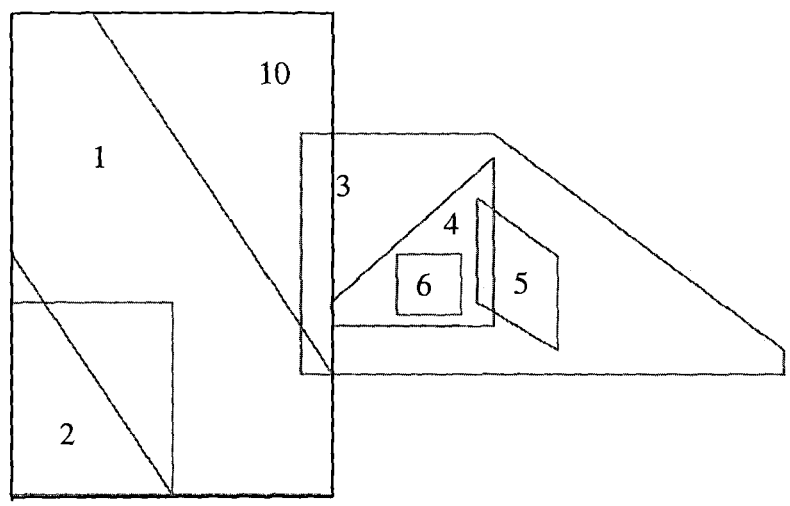
FIG. 28 illustrates the relationship between the polytopes of FIG. 25 along with the enclosing set for polytope 1.
Figure 29:
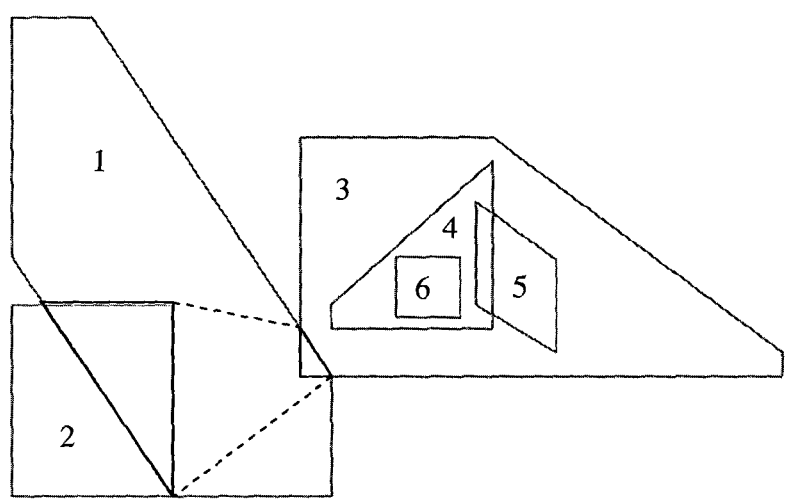
FIG. 29 illustrates the relationship between the polytopes of FIG. 25 along with the enclosing set for polytope 3.
Figure 30:
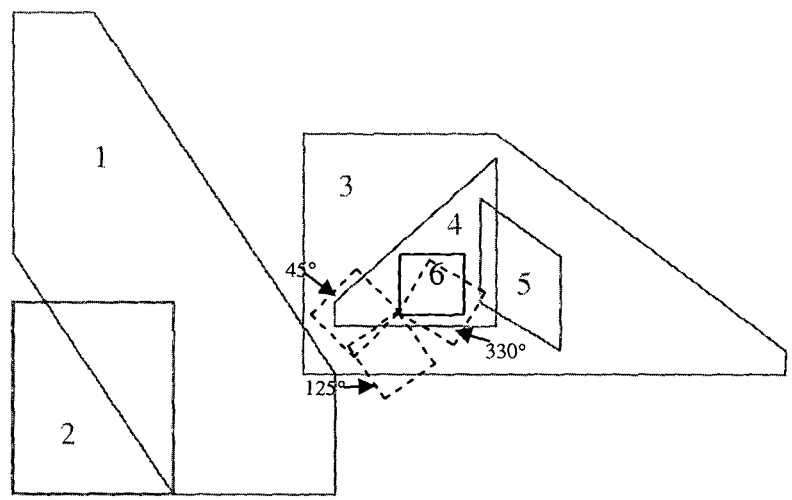
FIG. 30 illustrates the different rotated positions of a polytope.

FIG. 25 illustrates the subset-intersection-disjoint relationship between 6 different constraint sets/polytopes. The relationship among the above constraint sets/polytope is shown.
 1. The relations among the constraint sets are as follows
    a. Set 1 and set 2 intersect each other
    b. Set 1 and set 3 intersect each other
    c. Set 2 and set 3 disjoint from each other
    d. Set 4, 5 and 6 are subsets of set 3
    e. Set 6 is a subset of set 4
    f. Set 4 and Set 5 intersect
 2. The polytopes can be stored in primal space or in dual space. In the dual space, for dual polytopes full accuracy for linear programming is achieved because of having the same matrix (no calculations are needed to obtain a linear programming dual). If two primal polytopes intersect, lower bounds for the dual polytopes are achieved corresponding to it. For example, in the FIG. 25, polytope 6 is a subset of polytopes 3 and 4. So if the feasible point lies within polytope 6, then lower bounds for the dual polytopes of all 3, 4 and 6 simultaneously is achieved. The lower bounds obtained can be stored with the subset-intersection graph itself or calculated at very high speeds. For 2 polytopes, if it quickly found that their dual polytopes are unbounded, then the primal polytopes are said to be infeasible or disjoint. If duals don't intersect primal are infeasible.
 3. If constraints 3 and 4 are dropped from set 1 and constraints 1 and 3 are dropped from set 3, even then the relationships among the constraint sets do not change. Thus computing the polytopes with fewer hyperplanes will give same results.
    In fact, if instead of taking all the constraints, the rectangles are enclosed for constraint sets 1 and 3 for our query computations, the same, answers are produced.
 4. Constraint set 1 is a polytope with 6 faces, set 2 has only 4 faces and set 3 has 5 faces. These can be generated from materialized polytopes stored in the database having 4, 5 and 6 faces.
 5. The intersection, subset and disjoint relationships among the polytopes can be maintained as an I-structure with the edge attribute indicating the relationship. This is illustrated in FIG. 26 where the dashed edge indicates that the two polytopes are disjoint and the un-dashed edge named I represents an intersection and the un-dashed edge named S represents a subset relationship. This graph acts like an index that can return back quick results for queries such as 'Which are the polytopes intersecting with polytope 4' without solving any LP.
 6. The database can also store convexified approximations of nodes which are commonly used. This is done in order to reduce the time taken during preprocessing. FIG. 28 illustrates the relationships for the polytopes above with the node/polytope 10 as the convexified approximation of node/polytope 1. A query using the convexified approximation will also return back the same results.
 7. For non convex bodies: such as OR of the intersection of set 1 and set 2 and set 1 and set 3, a simple approach will be to replace it with a convex approximation. In this case a simple approximation can be just set 1, but tighter approximations can be found by taking the convex hull of the intersections and this will depend on time/resource constraints. In FIG. 29, the convex hull of the two intersections are shown by adding the dotted line facets to the union of the intersection of set 1 and set 2 and set 1 and set 3 in FIG. 28. Convexification can also be done for bodies that are already convex in order to simplify them. As an example, the enclosing rectangle for set 3 is shown, by adding the dash-dotted line facets to the set in FIG. 29. This simplifies it from a 5 faceted polyhedron to a 4 faceted one.
 8. Often other techniques like partial query handling can be employed to reduce the runtime further. Optimizations are done to yield partial answers. For example, a query to return all the subsets of polytope 4 can be partially answered at high speed by returning the ones that are not disjoint, i.e. polytopes 3 and 6, which may possible, be subsets.
 9. Transformations of polytopes will change the relationships with other polytopes. FIG. 30 shows several rotations of polytope 6. When rotated by 45°, it stops being a subset of set 4 and intersects with it. At 125° it stops being a subset of set 3 and intersects with it. At 330°, it starts intersecting with set 5 with which it was previously disjoint. With our approach, it is possible not only to query a given polytope, but also to execute queries for all its rotated versions simply by asking if there exists an orthogonal matrix Q such that a given polytope Ax<=b intersects with the polytope given by (QB)x<=d. Thus it is possible to find out if a polytope intersects with any rotated version of another polytope.
 10. Consider two polytopes in dual space:

$$A_1 d <= b_1 \quad (23)$$

$$A_2 d <= b_2 \quad (24)$$

If these two polytopes intersect at a point d*, then a lower bound is obtained for the following primal LP $$\text{Min}[b1'b2']x \quad (25)$$

$$\text{Subject to } [A1'A2']x <= C \quad (26)$$

for every value of C, by computing C' d* for a feasible point in the intersection d*. If we store the feasible point d* we can find the lower bound very quickly.

Maximizing C' d* yields the objective value of the primal. However, if there are multiple cost coefficient vectors, then we need to store/compute as many d's as the cost coefficient vectors C's. We can save storage by not computing a new d* for every C', but just choose amongst the objective function reached at a few of the feasible vertices (which are stored).

Figure 31:
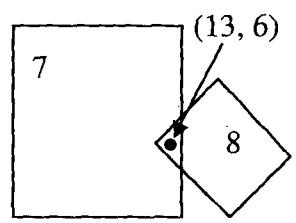
FIG. 31 illustrates the intersection of two polytopes.

FIG. 31 shows two polytopes, set 7 and set 8, intersecting. They are shown as Tables 3 and 4 in the Annexure.

The set of points where these two intersect is d*. Point (13, 6) □d*.

The primal problem is then:
Minimize $$14x1+16x2+6x3+18x4+28x5+18x6$$

Subject to $$x1+x3+x4+x5+x6<=c1$$

$$x2-x3-x4+x5+x6<=c2$$

$$x1<=c3$$

$$x2<=c4$$

$$x3<=c5$$

$$-x4<=c6$$

$$x5<=c7$$

$$-x6<=c8$$

For C'=[5, 10, 0, 0, 0, 0, 0, 0], C'd*=125, which is a lower bound for the primal objective function for the given C'.

Unlike 3D-GIS databases, the cost function used here makes it possible to write queries such as:

SELECT * from Table, where C'x>=100

This could mean, select me those polytopes, at which the cost/revenue/profit is at least 100.

Also, while GIS datasets are only 3D, our datasets are high dimensional, which makes query indexing different from GIS databases, where R-trees etc. can be used.

Implementation: An Exemplary Embodiment of the Ideas
Performance of Operations

The results of executing basic operations on set of polytopes are described below. The average time taken for executing disjoint and intersection is lesser in disk-resident approach. On the other hand, the average time taken for execution of subset and superset is lesser in case of in-memory approach.

Table 5 (Annexure) displays the result of 4 Dimensional comparisons.

Table 6 (Annexure) displays the result of 20 Dimensional comparisons. The time taken increases when the dimension of data dealing with it increases. The above results mentioned are the experiments conducted on a set of 10000 files.

The results of transformation of constraints set into another constraints set and query processing are presented herein after.

Performance of Subset-Intersection-Disjoint Methods.

The runtimes of methods 1, 2 and 3 have been individually compared in the table 7. It shows the runtime in milliseconds when subset relation exists and does not exist for 4 constraint sets. We compare the runtimes with polytopes of 100 variables. Method 4 produces fast results even for 100 variables polytopes, having subset relation. However, Method 5 is much faster when there is no subset relation as it very quickly hits against an infeasible point and declares that it is not a subset as compared to method 4 where every constraint will have to be checked before confirming if they are subset or not. For example method 5 takes only 29 ms as against method 4 which takes 265 ms for two polytopes with 400 variables and 100 constraints when no subset exists. But method 4 takes only 268 ms for two polytopes as against 11400 ms for method 5 when subset relation exists between two polytopes.

Performance of Scaling Method

The method takes less than a second for less than 30D since it does not depend on dimension of the polytope. It just works on the H matrix, to obtain appropriate result by keeping the volume constant. Hence, as the size of H matrix increases, it takes more time. Table 8 (Annexure) indicates the same.

Performance of Rotation Method

The method takes less than seconds since it works on face equations only, which was given as input. It, just works on the H matrix, to get the appropriate result by keeping the volume constant. Hence the size of H matrix increases, it takes more time. Table 9 indicates the same.

Performance of Distortion Method

The method takes less than a second for less than 30D since it does not depend on dimension of the polytope. It just works on the H matrix, to get the appropriate result by keeping the volume constant. Hence the size of H matrix increases, it takes more time. Table 10 (Annexure) indicates the same.

Query Processing of Shape Transformation

The database is converted to Main Memory Database. This strategy gives the query processor time efficiency by many ways like File I/O time reduction as the polytope is stored in a better data structure than a file structure which is accessed through indexing. The method is coded in Java. Table 11 and 12 (Annexure) shows the execution time to process the query in memory and in disk in 4 GB RAM and 1.83 GHz machine. Queries are run in a database which consists of 100,000 of all 20D polytopes.

After comparing table 11 and table 12, it can be considered that main memory database reduces the computation time to a great extent. Since the test database had only 20D, it took more time. But in actual scenario, database may consist of polytopes with different dimensions, which actually reduces the time of query processing to even lesser time and whereas, the actually File I/O time remains constant.

Application of the Invention

Figure 32:
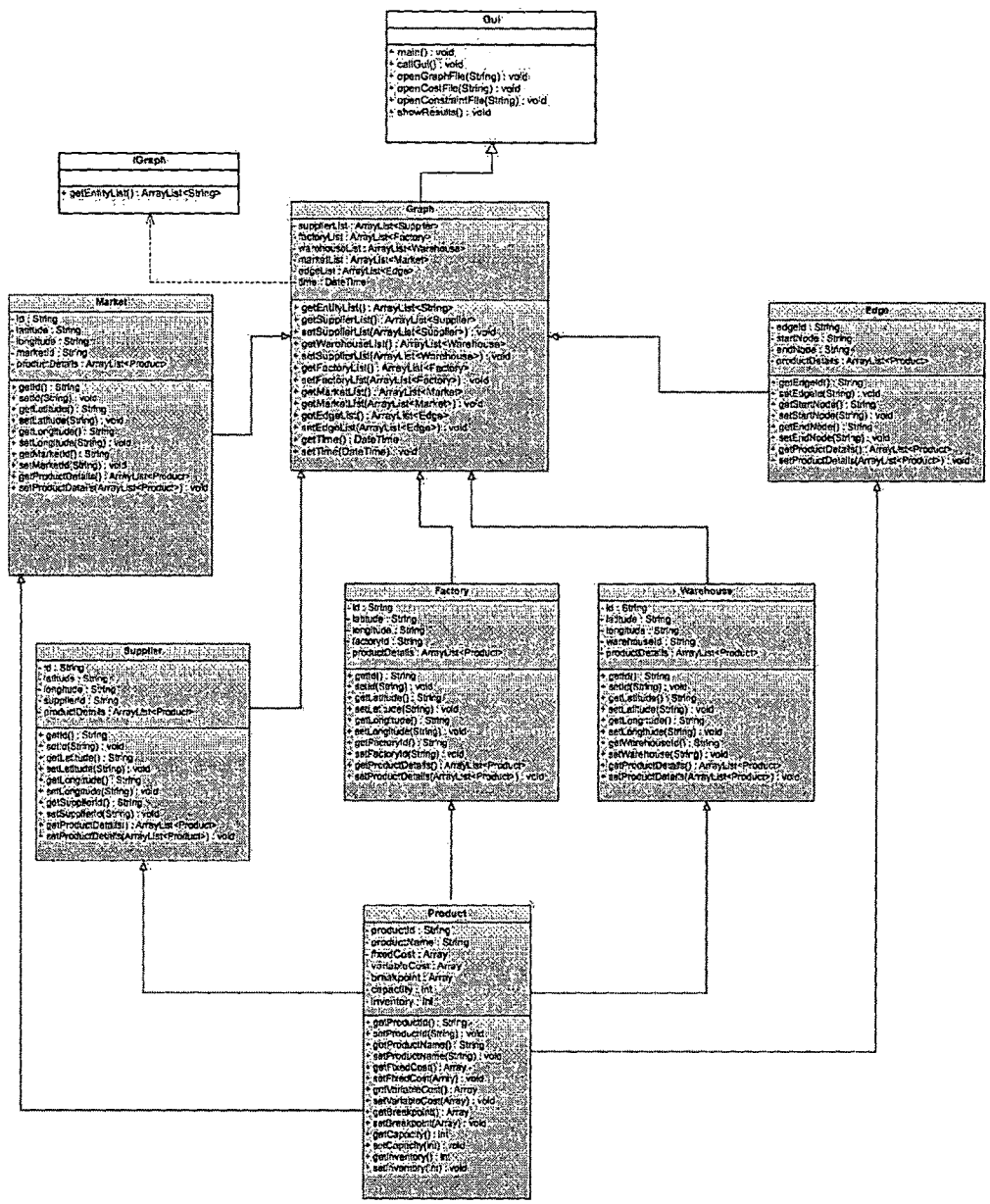
FIG. 32 illustrates class diagram from SCM application.
Figure 33:
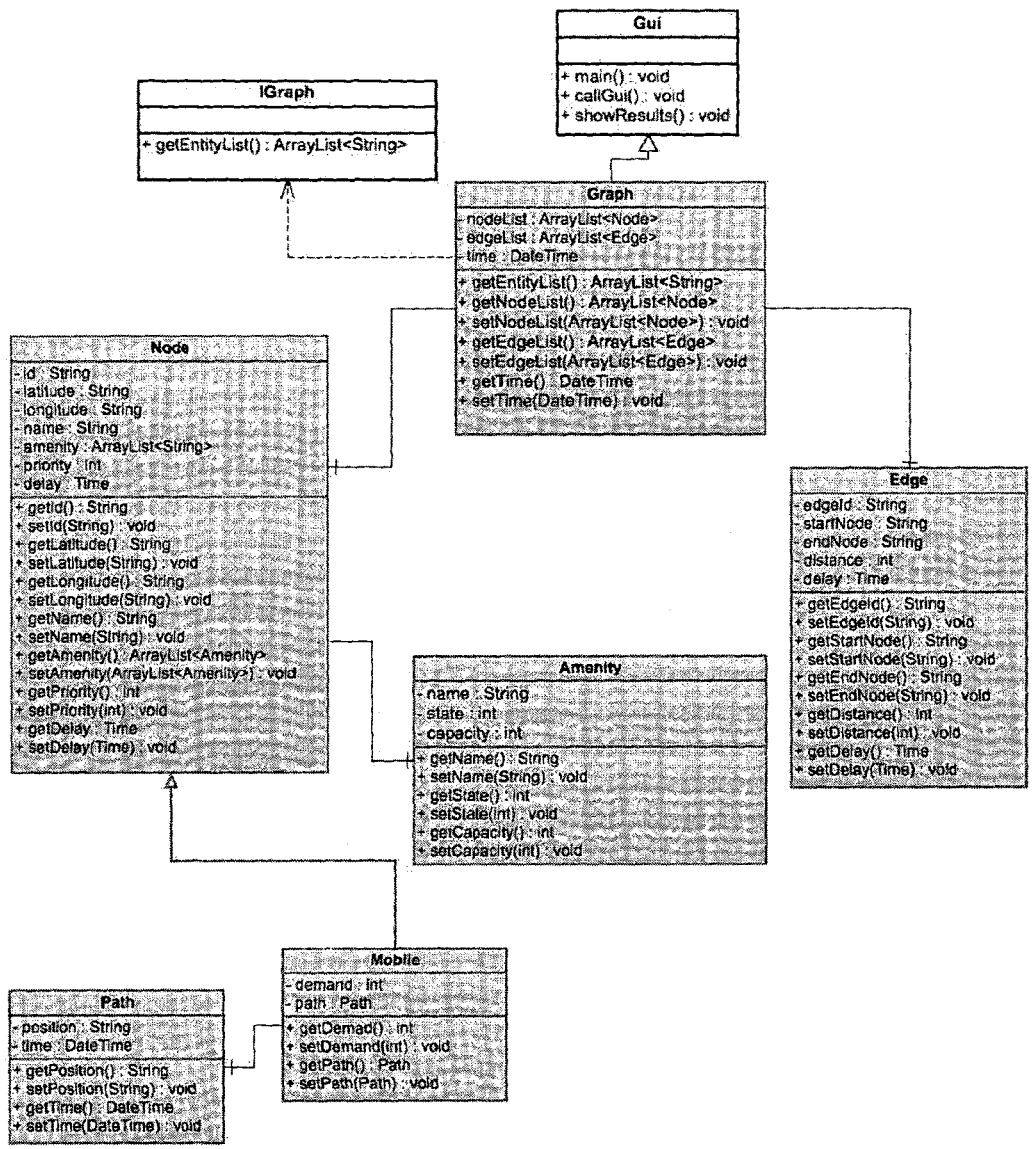
FIG. 33 illustrates class diagram from RTS application.
Figure 34:
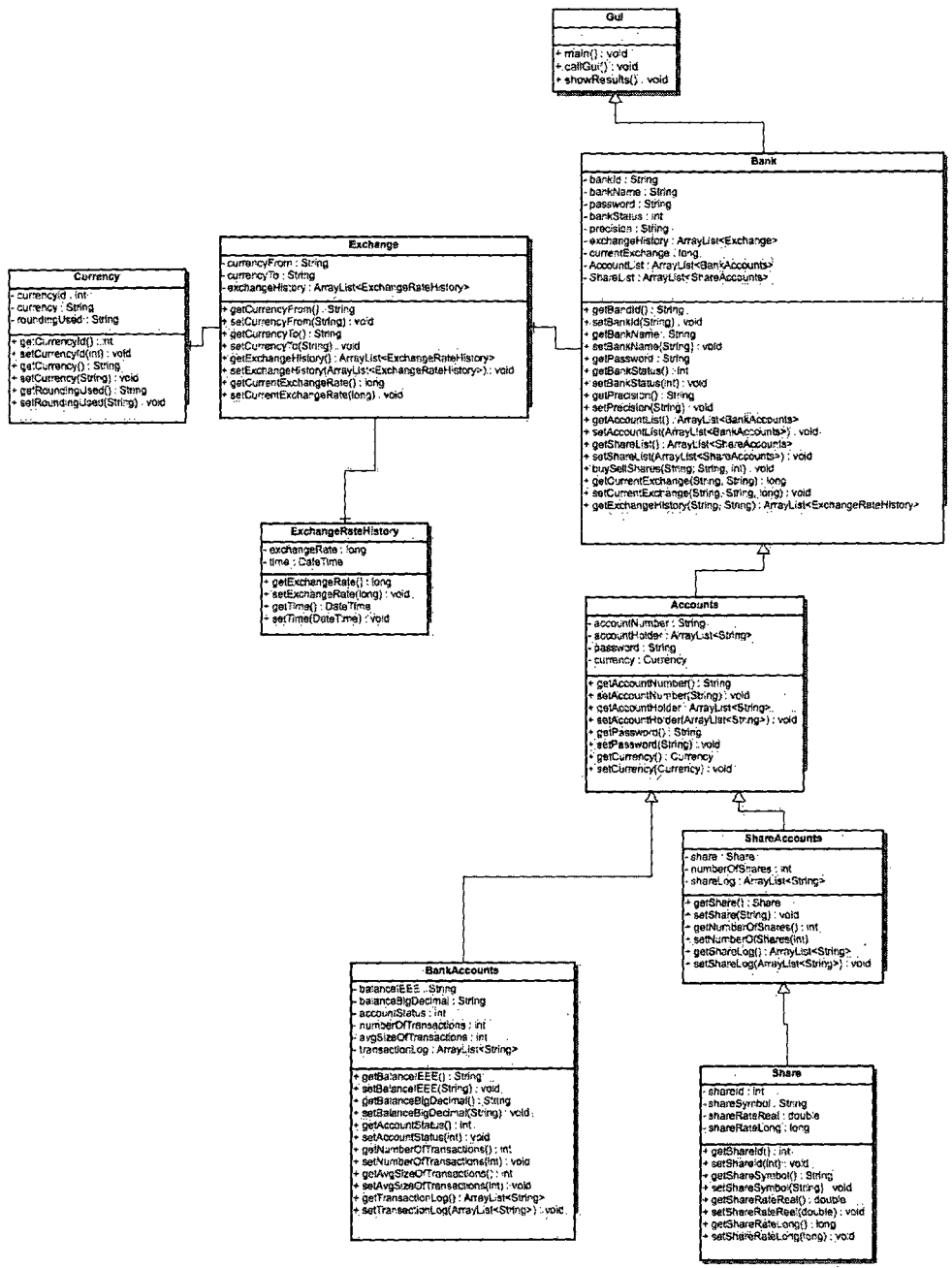
FIG. 34 illustrates class diagram from banking application.

The invention finds its usage in the applications, which handle constraint data. The constraints are taken as an input and manipulated to get the desired results. Applications such as Supply Chain Management (SCM), Real Time Search (RTS) and Banking may use such kind of database primarily because of the handling of large linear programming problems being handled by them. In SCM, the constraints are the demands at various nodes, while, in RTS the constraints are the queries given to the system. Similarly, in banking the constraints is the liquid flow of cash. These linear constraints can be stored in the database and can be quickly accessed and transformed into various forms for better analysis of the data. FIGS. 32, 33 and 34, where each of the application SCM, RTS and banking have been described using class diagrams, gives a brief idea about the database.

All of our methods generalize to convex bodies directly, with the observation that non-rectilinear faces have to be approximated using linear faces, or surface fitting techniques, leading to general non-linear convex constraints and convex programming instead of linear programming.

Annexure

Constraint Set 1-Polytope P1 structure     (19)

5.96dem_1_+4.45dem_2_+1.04dem_3_+4.63dem_4_+
    2.38dem_5<=446
5.96dem_1_+4.45dem_2_+1.04dem_3_+4.63dem_4_+
    2.38dem_5_>=73
1.19dem_1_+3.31dem_2_+2.07dem_3_+3.78dem_4_+
    5.37dem_5_<=226
1.19dem_1_+3.31dem_2_+2.07dem_3_+3.78dem_4_+
    5.37dem_5_>=70

$4.28\text{dem}\_6\_+4.56\text{dem}\_7\_+3.19\text{dem}\_8+2.94\text{dem}\_9\_+1.88\text{dem}\_{10}\_<=387$ $4.28\text{dem}\_6+4.56\text{dem}\_7\_+3.19\text{dem}\_8\_+2.94\text{dem}\_9\_+1.88\text{dem}\_{10}\_>=65$ $2.74\text{dem}\_6\_+1.16\text{dem}\_7\_+6.97\text{dem}\_8\_+9.30\text{dem}\_9+10.21\text{dem}\_{10}\_<=470$ $2.74\text{dem}\_6\_+1.16\text{dem}\_7\_+6.97\text{dem}\_8\_+9.30\text{dem}\_9\_+10.21\text{dem}\_{10}\_>=57$ $1.61\text{dem}\_{11}\_+3.17\text{dem}\_{12}\_+6.87\text{dem}\_{13}\_+2.29\text{dem}\_{14}\_+10.39\text{dem}\_{15}\_<=384$ $1.61\text{dem}\_{11}\_+3.17\text{dem}\_{12}\_+6.87\text{dem}\_{13}\_+2.29\text{dem}\_{14}\_+10.39\text{dem}\_{15}\_>=82$ $4.28\text{dem}\_{11}\_+7.25\text{dem}\_{12}\_+6.18\text{dem}\_{13}\_+5.52\text{dem}\_{14}\_+5.35\text{dem}\_{15}\_<=213$ $4.28\text{dem}\_{11}\_+7.25\text{dem}\_{12}\_+6.18\text{dem}\_{13}\_+5.52\text{dem}\_{14}\_+5.35\text{dem}\_{15}\_>=90$ $8.41\text{dem}\_{16}\_+9.13\text{dem}\_{17}\_+6.88\text{dem}\_{18}\_+10.51\text{dem}\_{19}\_+2.29\text{dem}\_{20}\_<=457$ $8.41\text{dem}\_{16}\_+9.13\text{dem}\_{17}\_+6.88\text{dem}\_{18}\_+10.51\text{dem}\_{19}\_+2.29\text{dem}\_{20}\_>=92$ $1.78\text{dem}\_{16}\_+1.07\text{dem}\_{17}\_+2.46\text{dem}\_{18}\_+7.28\text{dem}\_{19}\_+3.19\text{dem}\_{20}\_<=89$ $1.78\text{dem}\_{16}\_+1.07\text{dem}\_{17}\_+2.46\text{dem}\_{18}\_+7.28\text{dem}\_{19}\_+3.19\text{dem}\_{20}\_>=73$ $\text{dem}\_1\_+\text{dem}\_2\_+\text{dem}\_3\_+\text{dem}\_4\_+\text{dem}\_5\_+\text{dem}\_6\_+\text{dem}\_7\_+\text{dem}\_8\_+\text{dem}\_9\_+\text{dem}\_{10}\_+\text{dem}\_{11}\_+\text{dem}\_{12}\_+\text{dem}\_{13}\_+\text{dem}\_{14}\_+\text{dem}\_{15}\_+\text{dem}\_{16}\_+\text{dem}\_{17}\_+\text{dem}\_{18}\_+\text{dem}\_{19}\_+\text{dem}\_{20}\_<=400$ $\text{dem}\_1+\text{dem}\_2+\text{dem}\_3+\text{dem}\_4+\text{dem}\_5+\text{dem}\_6+\text{dem}\_7+\text{dem}\_8+\text{dem}\_9+\text{dem}\_{10}>=50$ $\text{dem}\_{11}\_+\text{dem}\_{12}\_+\text{dem}\_{13}\_+\text{dem}\_{14}\_+\text{dem}\_{15}\_+\text{dem}\_{16}\_+\text{dem}\_{17}\_+\text{dem}\_{18}\_+\text{dem}\_{19}+\text{dem}\_{20}\_>=70$ $\text{dem}\_5\_+\text{dem}\_6\_+\text{dem}\_7\_+\text{dem}\_8\_+\text{dem}\_9\_>=40$ Constraint Set 2–Polytope P2 structure (20)

$5.96\text{dem}\_1\_+4.45\text{dem}\_2\_+1.04\text{dem}\_3\_+4.63\text{dem}\_4\_+2.38\text{dem}\_5\_<=500$ $5.96\text{dem}\_1\_+4.45\text{dem}\_2\_+1.04\text{dem}\_3\_+4.63\text{dem}\_4\_+2.38\text{dem}\_5\_>=65$ $1.19\text{dem}\_1\_+3.31\text{dem}\_2\_+2.07\text{dem}\_3\_+3.78\text{dem}\_4\_+5.37\text{dem}\_5\_<=250$ $1.19\text{dem}\_1\_+3.31\text{dem}\_2\_+2.07\text{dem}\_3\_+3.78\text{dem}\_4\_+5.37\text{dem}\_5\_>=60$ $4.28\text{dem}\_6\_+4.56\text{dem}\_7\_+3.19\text{dem}\_8\_+2.94\text{dem}\_9\_+1.88\text{dem}\_{10}\_<=400$ $4.28\text{dem}\_6\_+4.56\text{dem}\_7\_+3.19\text{dem}\_8\_+2.94\text{dem}\_9\_+1.88\text{dem}\_{10}\_>=50$ $2.74\text{dem}\_6\_+1.16\text{dem}\_7\_+6.97\text{dem}\_8\_+9.30\text{dem}\_9\_+10.21\text{dem}\_{10}\_<=500$ $2.74\text{dem}\_6\_+1.16\text{dem}\_7\_+6.97\text{dem}\_8\_+9.30\text{dem}\_9\_+10.21\text{dem}\_{10}\_>=50$ $1.61\text{dem}\_{11}\_+3.17\text{dem}\_{12}\_+6.87\text{dem}\_{13}\_+2.29\text{dem}\_{14}\_+10.39\text{dem}\_{15}\_<=400$ $1.61\text{dem}\_{11}\_+3.17\text{dem}\_{12}\_+6.87\text{dem}\_{13}\_+2.29\text{dem}\_{14}\_+10.39\text{dem}\_{15}\_>=75$ $4.28\text{dem}\_{11}\_+7.25\text{dem}\_{12}\_+6.18\text{dem}\_{13}\_+5.52\text{dem}\_{14}\_+5.35\text{dem}\_{15}\_<=225$ $4.28\text{dem}\_{11}\_+7.25\text{dem}\_{12}\_+6.18\text{dem}\_{13}\_+5.52\text{dem}\_{14}\_+5.35\text{dem}\_{15}>=75$ $8.41\text{dem}\_{16}\_+9.13\text{dem}\_{17}\_+6.88\text{dem}\_{18}\_+10.51\text{dem}\_{19}\_+2.29\text{dem}\_{20}\_<=476$ $8.41\text{dem}\_{16}\_+9.13\text{dem}\_{17}\_+6.88\text{dem}\_{18}\_+10.51\text{dem}\_{19}\_+2.29\text{dem}\_{20}\_>=78$ $1.78\text{dem}\_{16}\_+1.07\text{dem}\_{17}\_+2.46\text{dem}_2{18}\_+7.28\text{dem}\_{19}\_+3.19\text{dem}\_{20}\_<=97$ $1.78\text{dem}\_{16}\_+1.07\text{dem}\_{17}\_+2.46\text{dem}\_{18}\_+7.28\text{dem}\_{19}\_+3.19\text{dem}\_{20}\_>=62$ $\text{dem}\_1\_+\text{dem}\_2\_+\text{dem}\_3\_+\text{dem}\_4\_+\text{dem}\_5\_+\text{dem}\_6\_+\text{dem}\_7\_+\text{dem}\_8\_+\text{dem}\_9\_+\text{dem}\_{10}\_+\text{dem}\_{11}\_+\text{dem}\_{12}\_+\text{dem}\_{13}\_+\text{dem}\_{14}\_+\text{dem}\_{15}\_+\text{dem}\_{16}\_+\text{dem}\_{17}\_+\text{dem}\_{18}\_+\text{dem}\_{19}\_+\text{dem}\_{20}\_<=450$ $\text{dem}\_1\_+\text{dem}\_2\_+\text{dem}\_3\_+\text{dem}\_4\_+\text{dem}\_5\_+\text{dem}\_6\_+\text{dem}\_7\_+\text{dem}\_8\_+\text{dem}\_9\_+\text{dem}\_{10}\_>=40$ $\text{dem}\_{11}\_+\text{dem}\_{12}\_+\text{dem}\_{13}\_+\text{dem}\_{14}\_+\text{dem}\_{15}\_+\text{dem}\_{16}\_+\text{dem}\_{17}\_+\text{dem}\_{18}\_+\text{dem}\_{19}\_+\text{dem}\_{20}\_>=60$ $\text{dem}\_5\_+\text{dem}\_6\_+\text{dem}\_7\_+\text{dem}\_8\_+\text{dem}\_9\_>=35$ Constraint Set 3–Polytope P3 structure (21)

$5.96\text{dem}\_1\_+4.45\text{dem}\_2\_+1.04\text{dem}\_3\_+4.63\text{dem}\_4\_+2.38\text{dem}\_5\_<=500$ $5.96\text{dem}\_1\_+4.45\text{dem}\_2\_+1.04\text{dem}\_3\_+4.63\text{dem}\_4\_+2.38\text{dem}\_5\_>=75$ $1.19\text{dem}\_1\_+3.31\text{dem}\_2\_+2.07\text{dem}\_3\_+3.78\text{dem}\_4\_+5.37\text{dem}\_5\_<=250$ $1.19\text{dem}\_1\_+3.31\text{dem}\_2\_+2.07\text{dem}\_3\_+3.78\text{dem}\_4\_+5.37\text{dem}\_5\_>=75$ $4.28\text{dem}\_6\_+4.56\text{dem}\_7\_+3.19\text{dem}\_8\_+2.94\text{dem}\_9\_+1.88\text{dem}\_{10}\_<=400$ $4.28\text{dem}\_6\_+4.56\text{dem}\_7\_+3.19\text{dem}\_8\_+2.94\text{dem}\_9\_+1.88\text{dem}\_{10}\_>=65$ $2.74\text{dem}\_6\_+1.16\text{dem}\_7\_+6.97\text{dem}\_8\_+9.30\text{dem}\_9\_+10.21\text{dem}\_{10}\_<=500$ $2.74\text{dem}\_6\_+1.16\text{dem}\_7\_+6.97\text{dem}\_8\_+9.30\text{dem}\_9\_+10.21\text{dem}\_{10}\_>=57$ $1.61\text{dem}\_{11}\_+3.17\text{dem}\_{12}\_+6.87\text{dem}\_{13}\_+2.29\text{dem}\_{14}\_+10.39\text{dem}\_{15}\_<=400$ $1.61\text{dem}\_{11}\_+3.17\text{dem}\_{12}\_+6.87\text{dem}\_{13}\_+2.29\text{dem}\_{14}\_+10.39\text{dem}\_{15}\_>=85$ $4.28\text{dem}\_{11}\_+7.25\text{dem}\_{12}\_+6.18\text{dem}\_{13}\_+5.52\text{dem}\_{14}\_+5.35\text{dem}\_{15}\_<=225$ $4.28\text{dem}\_{11}\_+7.25\text{dem}\_{12}\_+6.18\text{dem}\_{13}\_+5.52\text{dem}\_{14}\_+5.35\text{dem}\_{15}\_>=90$ $8.41\text{dem}\_{16}\_+9.13\text{dem}\_{17}\_+6.88\text{dem}\_{18}\_+10.51\text{dem}\_{19}\_+2.29\text{dem}\_{20}\_<=476$ $8.41\text{dem}\_{16}\_+9.13\text{dem}\_{17}\_+6.88\text{dem}\_{18}\_+10.51\text{dem}\_{19}\_+2.29\text{dem}\_{20}\_>=95$ $1.78\text{dem}\_{16}\_+1.07\text{dem}\_{17}\_+2.46\text{dem}\_{18}\_+7.28\text{dem}\_{19}\_+3.19\text{dem}\_{20}\_<=97$ $1.78\text{dem}\_{16}\_+1.07\text{dem}\_{17}\_+2.46\text{dem}\_{18}\_+7.28\text{dem}\_{19}\_+3.19\text{dem}\_{20}\_>=75$ $\text{dem}\_1\_+\text{dem}\_2\_+\text{dem}\_3\_+\text{dem}\_4\_+\text{dem}\_5\_+\text{dem}\_6\_+\text{dem}\_7\_+\text{dem}\_8\_+\text{dem}\_9\_+\text{dem}\_{10}\_+\text{dem}\_{11}\_+\text{dem}\_{12}\_+\text{dem}\_{13}\_+\text{dem}\_{14}\_+\text{dem}\_{15}\_+\text{dem}\_{16}\_+\text{dem}\_{17}\_+\text{dem}\_{18}\_+\text{dem}\_{19}\_+\text{dem}\_{20}\_<=450$ $\text{dem}\_1\_+\text{dem}\_2\_+\text{dem}\_3\_+\text{dem}\_4\_+\text{dem}\_5\_+\text{dem}\_6\_+\text{dem}\_7\_+\text{dem}\_8\_+\text{dem}\_9\_+\text{dem}\_{10}\_>=55$ $\text{dem}\_{11}\_+\text{dem}\_{12}\_+\text{dem}\_{13}\_+\text{dem}\_{14}\_+\text{dem}\_{15}\_+\text{dem}\_{16}\_+\text{dem}\_{17}\_+\text{dem}\_{18}\_+\text{dem}\_{19}\_+\text{dem}\_{20}\_>=70$ $\text{dem}\_5\_+\text{dem}\_6\_+\text{dem}\_7\_+\text{dem}\_8\_+\text{dem}\_9\_>=45$ Constraint Set 4–Polytope P4 structure (22)

$5.96\text{dem}\_{M0}\_{p0}+4.45\text{dem}\_2\_+1.04\text{dem}\_3\_+4.63\text{dem}\_4\_+2.38\text{dem}\_5\_<=900$ $5.96\text{dem}\_{M0}\_{p0}+4.45\text{dem}\_2\_+1.04\text{dem}\_3\_+4.63\text{dem}\_4\_+2.38\text{dem}\_5\_>=570$ $1.19\text{dem}\_{M0}\_{p0}+3.31\text{dem}\_2\_+2.07\text{dem}\_3\_+3.78\text{dem}\_4\_+5.37\text{dem}\_5\_<=760$ $1.19\text{dem}\_{M0}\_{p0}+3.31\text{dem}\_2\_+2.07\text{dem}\_3\_+3.78\text{dem}\_4\_+5.37\text{dem}\_5\_>=300$ $4.28\text{dem}\_6\_+4.56\text{dem}\_7\_+3.19\text{dem}\_8\_+2.94\text{dem}\_9\_+1.88\text{dem}\_{10}\_<=990$ $4.28\text{dem}\_6\_+4.56\text{dem}\_7\_+3.19\text{dem}\_8\_+2.94\text{dem}\_9\_+1.88\text{dem}\_{10}\_>=475$ $2.74\text{dem}\_6\_+1.16\text{dem}\_7\_+6.97\text{dem}\_8\_+9.30\text{dem}\_9\_+10.21\text{dem}\_10\_<=980$ $2.74\text{dem}\_6\_+1.16\text{dem}\_7\_+6.97\text{dem}\_8\_+9.30\text{dem}\_9\_+10.21\text{dem}\_10\_>=550$ $1.61\text{dem}\_11\_+3.17\text{dem}\_12\_+6.87\text{dem}\_13\_+2.29\text{dem}\_14\_+10.39\text{dem}\_15\_<=879$ $1.61\text{dem}\_11\_+3.17\text{dem}\_12\_+6.87\text{dem}\_13\_+2.29\text{dem}\_14\_+10.39\text{dem}\_15\_>=490$ $4.28\text{dem}\_11\_+7.25\text{dem}\_12\_+6.18\text{dem}\_13\_+5.52\text{dem}\_14\_+5.35\text{dem}\_15\_<=894$ $4.28\text{dem}\_11\_+7.25\text{dem}\_12\_+6.18\text{dem}\_13\_+5.52\text{dem}\_14\_+5.35\text{dem}\_15\_>=356$ $8.41\text{dem}\_16\_+9.13\text{dem}\_17\_+6.88\text{dem}\_18\_+10.51\text{dem}\_19\_+2.29\text{dem}\_20\_<=986$ $8.41\text{dem}\_16\_+9.13\text{dem}\_17\_+6.88\text{dem}\_18\_+10.51\text{dem}\_19\_+2.29\text{dem}\_20\_>=567$ $1.78\text{dem}\_16\_+1.07\text{dem}\_17\_+2.46\text{dem}\_18\_+7.28\text{dem}\_19\_+3.19\text{dem}\_20\_<=783$ $1.78\text{dem}\_16\_+1.07\text{dem}\_17\_+2.46\text{dem}\_18\_+7.28\text{dem}\_19\_+3.19\text{dem}\_20\_>=200$ $\text{dem}\_M0\_p0+\text{dem}\_2\_+\text{dem}\_3\_+\text{dem}\_4\_+\text{dem}\_5\_+\text{dem}\_6\_+\text{dem}\_7\_+\text{dem}\_8\_+\text{dem}\_9\_+\text{dem}\_10\_+\text{dem}\_11\_+\text{dem}\_12\_+\text{dem}\_13\_+\text{dem}\_14\_+\text{dem}\_15\_+\text{dem}\_16\_+\text{dem}\_17\_+\text{dem}\_18\_+\text{dem}\_19\_+\text{dem}\_20\_<=876$ $\text{dem}\_M0\_p0+\text{dem}\_2\_+\text{dem}\_3\_+\text{dem}\_4\_+\text{dem}\_5\_+\text{dem}\_6\_+\text{dem}\_7\_+\text{dem}\_8\_+\text{dem}\_9\_+\text{dem}\_10\_>=300$ $\text{dem}\_11\_+\text{dem}\_12\_+\text{dem}\_13\_+\text{dem}\_14\_+\text{dem}\_15\_+\text{dem}\_16\_+\text{dem}\_17\_+\text{dem}\_18\_+\text{dem}\_19\_+\text{dem}\_20\_>=350$ $\text{dem}\_5\_+\text{dem}\_6\_+\text{dem}\_7\_+\text{dem}\_8\_+\text{dem}\_9\_>=200$

TABLE 1

An example of the half-plane representation is shown in the constraint database. The table has polytopes C0, C1, and C2, stored row-wise. The column of constraints is the matrix Ax of the constraints of type Ax <= b which defines the polytope. The column b represents the right hand side of the constraint equation.. The variables column defines all the variables used in the polytope. The polytopes C1 and C2 are specified using half planes. Polytope C2 is constructed from the intersection of C0 and C1. Such a representation is an example of the synthetic database structure.

| Name | Constraints (A) | Inequality | b | Objective(c) | Variables |
|---|---|---|---|---|---|
| C0 | 2 x 1 + 3 x 2 | <= | 7 | 7 x 1 + 5 x 2 | x1 |
|  | 3 x 1 + 5 x 2 | >= | 34 |  | x2 |
|  | 4 x 1 + 8 x 2 | <= | 16 |  |  |
| C1 | 3 x 1 + 7 x 2 | >= | 23 | 3 x 1 + 6 x 2 | x1 |
|  | 5 x 1 + 6 x 2 | <= | 12 |  | x2 |
| C2 | C0⋂C1 |  |  | NULL | x1 |
|  |  |  |  |  | x2 |
| . |  |  |  |  |  |
| . |  |  |  |  |  |
| . |  |  |  |  |  |
| Cn |  |  |  |  |  |

Tables 2a-2f for constraint sets (Set 1-Set 6) in 2 variables:

TABLE 2a

Set 1

| id | constraint |
|---|---|
| 1 | 2 x + y >= 20 |
| 2 | 2 x + y <= 50 |
| 3 | x <= 20 |
| 4 | y <= 40 |

TABLE 2b

Set 2

| 1 | x <= 10 |
|---|---|
| 2 | y <= 16 |
| 3 | x >= 0 |
| 4 | y >= 0 |

TABLE 2c

Set 3

| 1 | x <= 50 |
|---|---|
| 2 | x >= 18 |
| 3 | y <= 30 |
| 4 | y >= 10 |
| 5 | x + y <= 60 |

TABLE 2d

Set 4

| 1 | x − y <= 2 |
|---|---|
| 2 | x <= 30 |
| 3 | y >= 14 |
| 4 | x >= 20 |

TABLE 2e

Set 5

| 1 | x <= 34 |
|---|---|
| 2 | x >= 29 |
| 3 | x + y <= 54 |
| 4 | x + y >= 46 |

TABLE 2f

Set 6

| 1 | x <= 28 |
|---|---|
| 2 | x >= 24 |
| 3 | y <= 20 |
| 4 | y >= 15 |

TABLE 3

Set 7

| 1 | d1 <= 14 |
|---|---|
| 2 | d2 <= 16 |
| 3 | d1 >= 0 |
| 4 | d2 >= 0 |

TABLE 4

Set 8

| 1 | d1 − d2 <= 6 |
|---|---|
| 2 | d1 − d2 >= 18 |
| 3 | d1 + d2 <= 28 |
| 4 | d1 + d2 >= 18 |

Table 5 displays the result of 4 Dimensional comparisons

TABLE 5

4 Dimensional Comparisons

| Operations | Average Time for Disk Resident (Time taken in seconds) | Average Time for In-Memory (Time taken in seconds) |
|---|---|---|
| Disjoint | 1.001 | 1.503 |
| Subset | 2.203 | 0.771 |
| Superset | 4.155 | 0.441 |
| Intersection | 0.271 | 0.671 |

Table 6 displays the result of 20 Dimensional comparisons. The time taken increases when the dimension of data dealing with it increases.

TABLE 6

20 Dimensional Comparisons

| Operations | Average Time for Disk Resident (Time taken in minutes) | Average Time for In-Memory (Time taken in minutes) |
|---|---|---|
| Disjoint | 4.926 | 13.965 |
| Subset | 65.656 | 33.304 |
| Superset | 72.724 | 12.460 |
| Intersection | 2.312 | 18.908 |

TABLE 7

Comparison of individual runtimes of methods 1, 2 and 3

| | Runtime in milliseconds (20 variables 50 constraints) | Runtime in milliseconds (100 variables 200 constraints) | Runtime in milliseconds (100 variables 400 constraints) |
|---|---|---|---|
| Method 4 (Disjoint polytopes) | <1 | 5 | 6 |
| Method 5 (Perturbation around extreme points): Intersecting but no subset | 10 | 23 | 29 |
| Method 6 (ILP): Intersecting but no subset | 23 | 73 | 151 |
| Method 4 (Subset): Subset exists | 28 | 116 | 268 |
| Method 4 (Subset): Intersecting but no subset | 29 | 116 | 265 |
| Method 6 (ILP): Subset exists | 125 | 1183 | 5837 |
| Method 5 (Perturbation around extreme points): Subset exists | 216 | 2244 | 11400 |

TABLE 8

Time taken for scaling of different dimension

| Dimension | Average Execution Time[1] (Seconds) |
|---|---|
| 2 D, 5 F | 0.000162 |
| 3 D, 7 F | 0.000168 |
| 6 D, 20 F | 0.000178 |
| 10 D, 31 F | 0.000196 |
| 20 D, 60 F | 0.000211 |
| 30 D, 99 F | 0.000232 |

[1]This program is run 1000 times and its average time is taken.

TABLE 9

Time taken for rotation of different dimension

| Dimension and Number of faces | Average Execution Time[1] (Seconds) (Includes generation of random orthogonal matrix using GS method) |
|---|---|
| 2 D, 10 F | 0.000261 |
| 3 D, 20 F | 0.000314 |
| 6 D, 25 F | 0.000504 |
| 10 D, 27 F | 0.000830 |
| 20 D, 49 F | 0.002179 |
| 30 D, 99 F | 0.004338 |

[1]Here, the rotation method is run 1,000 times including the generation of orthogonal matrix which dominates the run time. Its average is taken.

TABLE 10

Time taken by distortion operation of different dimensions

| Dimension | Average Execution Time[1] (Seconds) |
|---|---|
| 2 D, 5 F | 0.000073 |
| 3 D, 7 F | 0.000086 |
| 6 D, 20 F | 0.000132 |
| 10 D, 31 F | 0.000178 |
| 20 D, 60 F | 0.000234 |
| 30 D, 99 F | 0.000289 |

[1]This program is run 1000 times and its average time is taken.

TABLE 11

Time taken for query processing with file I/O (in disk)

| Query | Execution time (comparing with 5,101 number of polytopes which have same number of faces) |
|---|---|
| Scaling | 159.092 seconds |
| Rotation | 250.390 seconds |
| Distortion | 248.064 seconds |

TABLE 12

Time taken for query processing in MMDB (in memory)

| Query | Execution time (comparing with 5,101 number of polytopes which have same number of faces) |
|---|---|
| Scaling | 171 milli seconds |
| Rotation | 93.087 seconds |
| Distortion | 92.244 seconds |

REFERENCES

[1] Prasanna G. N. S et al; WO2010004587 A2 (2010); "A computer implemented decision support method and system".
[2] Prasanna G. N. S et al; WO 2010/004585 (2010); "Decision support methods under uncertainty".

The invention claimed is:
1. A method for generation of a database engine for at least one polytope, comprising:
   using half-plane representation and at least one constraint with high dimension;
   providing a facility to perform a query to find an intersection of at least one polytope; and
   storing the at least one polytope as a vertex-based representation or a facet-based representation for handling constraint data in a relational constraint database, wherein an architecture of the relational constraint database for the at least one polytope comprises the steps of:
a) creating a constraint set by adding, deleting, or modifying the at least one constraint;
b) forming the polytope by combining from at least two linear constraints;
c) storing the constraint set as the polytope in the relational constraint database as the vertex-based representation or the facet-based representation;
d) performing the query on the polytope; and
e) supporting a shape transformation of the at least one polytope and the query to access the transformed polytope.

2. The method as claimed in claim 1, wherein a new information equivalent data is generated from an old data.

3. The method as claimed in claim 1, wherein the polytope is represented as convex and a non-convex polytope body is represented using convexification.

4. The method as claimed in claim 3, wherein the query comprises discrete disjoint, intersection and subset.

5. The method as claimed in claim 1, wherein the query is performed to find the intersection of the at least one polytope.

6. The method as claimed in claim 1, wherein a database table of the relational constraint database contains an I-structure to speed up the query.

7. The method as claimed in claim 1, wherein the constraint data includes a demand at one or more nodes, a query in a system, and a liquid flow of cash.

8. The method as claimed in claim 1, wherein new and unseen data is generated using transformations and relationships between polyhedra using the facilities of scaling, rotation, distortion, and translation.

9. The method as claimed in claim 8, wherein a database table of the relational constraint database contains an I-structure to speed up the query.

10. The method as claimed in claim 8, wherein the database is cached.

11. The method as claimed in claim 1, implemented as a web service.

12. The method as claimed in claim 1, implemented as an ASIC.

13. The method as claimed in claim 1, wherein the shape transformation in step (e) yields new data from existing data.

14. The method as claimed in claim 1, wherein the polytope is stored in a dual form.

15. The method as claimed in claim 1, wherein the database is used with convex bodies and/or convex approximations of non-convex bodies using convexification techniques.

16. The method as claimed in claim 1, wherein the polytope is implemented as a combination of both a vertex and a half-plane representation.

17. A system for generation of a database engine for at least one polytope, comprising:
a processor communicatively coupled to a memory:
using half-plane representation and at least one constraint with high dimension stored in the memory:
providing a facility to perform a query to find an intersection of at least one polytope; and
storing the at least one polytope as a vertex-based representation or a facet-based representation for handling constraint data in a relational constraint database communicatively coupled to the processor,
wherein an architecture of the relational constraint database for the at least one polytope comprises:
a) a constraint set created by adding, deleting, or modifying the at least one constraint;
b) the polytope, which is formed by combining from at least two linear constraints;
c) the relational constraint database for storing the constraint set as the polytope in the vertex-based representation or the facet-based representation;
d) the query for performing on the polytope; and
e) a shape transformation for transforming the polytope.

18. The system as claimed in claim 17, wherein new and unseen data is generated using transformations and relationships between polyhedra using the facilities of scaling, rotation, distortion, and translation.

* * * * *